US010334867B2

(12) United States Patent
Buck et al.

(10) Patent No.: US 10,334,867 B2
(45) Date of Patent: Jul. 2, 2019

(54) METHOD FOR MANUFACTURING A COMESTIBLE

(71) Applicant: INTERCONTINENTNAL GREAT BRANDS LLC, East Hanover, NJ (US)

(72) Inventors: Ann E. Buck, Whippany, NJ (US); Bharat Jani, Whippany, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 354 days.

(21) Appl. No.: 15/123,387

(22) PCT Filed: Feb. 27, 2015

(86) PCT No.: PCT/US2015/018072
§ 371 (c)(1),
(2) Date: Sep. 2, 2016

(87) PCT Pub. No.: WO2015/134326
PCT Pub. Date: Sep. 11, 2015

(65) Prior Publication Data

US 2017/0215455 A1 Aug. 3, 2017

Related U.S. Application Data

(60) Provisional application No. 61/947,224, filed on Mar. 3, 2014.

(51) Int. Cl.

| | |
|---|---|
| *A23G 3/20* | (2006.01) |
| *A23G 4/02* | (2006.01) |
| *A23G 4/18* | (2006.01) |

(52) U.S. Cl.
CPC .......... *A23G 4/025* (2013.01); *A23G 3/2076* (2013.01); *A23G 3/2092* (2013.01); *A23G 4/02* (2013.01); *A23G 4/18* (2013.01)

(58) Field of Classification Search
None
See application file for complete search history.

(56) References Cited

U.S. PATENT DOCUMENTS

| | | | |
|---|---|---|---|
| 168,443 | A | 10/1875 | Arend |
| 571,921 | A | 11/1896 | Harton |

(Continued)

FOREIGN PATENT DOCUMENTS

| | | | |
|---|---|---|---|
| CN | 101453904 | A | 6/2009 |
| CN | 101708026 | A | 5/2010 |

(Continued)

OTHER PUBLICATIONS

JP 1st Office Action and translation, JP Application No. 2016-550532; dated Jun. 19, 2017, pp. 1-11.

(Continued)

*Primary Examiner* — Mary Lynn F Theisen
(74) *Attorney, Agent, or Firm* — Cantor Colburn LLP

(57) ABSTRACT

A method of manufacturing a comestible is provided including providing at least one manufacturing instrument configured to contact the comestible. A releasing agent is atomized and expelled from an expelling device. Application of pressure to the releasing agent is unnecessary to achieve the atomizing. The atomized releasing agent is applied to either a surface of the at least one manufacturing instrument configured to contact the comestible or to a surface of the comestible.

34 Claims, 3 Drawing Sheets

(56) References Cited

U.S. PATENT DOCUMENTS

| | | |
|---|---|---|
| 678,043 A | 7/1901 | Scott |
| 1,006,902 A | 10/1911 | Bickerton |
| 1,357,665 A | 11/1920 | Watkins |
| 1,629,461 A | 5/1927 | Berg |
| 1,684,436 A | 9/1928 | Dellenbarger |
| 1,771,506 A | 7/1930 | Mustin |
| 1,829,029 A | 10/1931 | Zimmerli et al. |
| 1,871,346 A | 8/1932 | Savy |
| 1,879,897 A | 9/1932 | Gernelle-Danloy |
| 2,156,810 A | 5/1939 | Garbutt |
| 2,227,728 A | 1/1941 | Lombi |
| 2,496,548 A | 2/1950 | La Rosa et al. |
| 2,507,477 A | 5/1950 | MacDonald et al. |
| 2,558,899 A | 7/1951 | Green |
| 2,604,056 A | 7/1952 | Mahle |
| 2,771,637 A | 11/1956 | Silvasy et al. |
| 2,941,655 A | 6/1960 | Wells |
| 3,215,407 A | 11/1965 | Dye |
| 3,215,536 A | 11/1965 | Simeone et al. |
| 3,366,992 A | 2/1968 | Seanor et al. |
| 3,384,498 A | 5/1968 | Ahrabi |
| 3,455,755 A | 7/1969 | Phillips |
| 3,492,131 A | 1/1970 | Schlatter |
| 3,570,417 A | 3/1971 | Herrmann |
| 3,585,923 A | 6/1971 | Waller |
| 3,632,358 A | 1/1972 | Echeandia |
| 3,644,169 A | 2/1972 | Phillips |
| 3,652,377 A | 3/1972 | Helmick |
| 3,765,918 A | 10/1973 | Jordan et al. |
| 3,779,034 A | 12/1973 | Morgan |
| 3,779,410 A | 12/1973 | Phillips et al. |
| 3,806,290 A | 4/1974 | Graff et al. |
| 3,857,963 A | 12/1974 | Graff et al. |
| 3,866,571 A | 2/1975 | Austin et al. |
| 3,871,328 A | 3/1975 | English |
| 3,881,708 A | 5/1975 | Carle |
| 3,908,032 A | 9/1975 | Didelot et al. |
| 3,962,463 A | 6/1976 | Witzel |
| 3,969,513 A | 7/1976 | Canonne |
| 3,995,064 A | 11/1976 | Ehrgott et al. |
| 4,032,661 A | 6/1977 | Rowsell et al. |
| 4,105,461 A | 8/1978 | Racciato |
| 4,117,645 A | 10/1978 | Phillips |
| 4,124,339 A | 11/1978 | Bernard |
| 4,136,163 A | 1/1979 | Watson et al. |
| 4,178,459 A | 12/1979 | Watson et al. |
| 4,187,320 A | 2/1980 | Koch et al. |
| 4,217,368 A | 8/1980 | Witzel et al. |
| 4,229,484 A | 10/1980 | Steels et al. |
| 4,230,688 A | 10/1980 | Rowsell et al. |
| 4,238,510 A | 12/1980 | Cherukuri et al. |
| 4,250,196 A | 2/1981 | Friello |
| 4,266,920 A | 5/1981 | Hayashi et al. |
| 4,274,535 A | 6/1981 | Haas, Sr. et al. |
| 4,279,931 A | 7/1981 | Verwaerde et al. |
| 4,296,255 A | 10/1981 | Roswell et al. |
| 4,299,825 A | 11/1981 | Lee |
| 4,352,824 A | 10/1982 | Puglia et al. |
| 4,352,825 A | 10/1982 | Cherukuri et al. |
| 4,357,355 A | 11/1982 | Koch et al. |
| 4,370,350 A | 1/1983 | Fisher et al. |
| 4,379,169 A | 4/1983 | Reggio et al. |
| 4,382,962 A | 5/1983 | Devos et al. |
| 4,388,343 A * | 6/1983 | Voss ................ B05B 5/025 239/4 |
| 4,405,647 A | 9/1983 | Fisher et al. |
| 4,428,679 A | 1/1984 | Fischer et al. |
| 4,431,678 A | 2/1984 | Sollich |
| 4,448,736 A | 5/1984 | Emery et al. |
| 4,454,834 A | 6/1984 | Haas, Sr. et al. |
| 4,459,311 A | 7/1984 | Detora et al. |
| 4,459,425 A | 7/1984 | Amano et al. |
| 4,466,983 A | 8/1984 | Cifrese et al. |
| 4,472,437 A | 9/1984 | Corsello et al. |
| 4,473,299 A | 9/1984 | Guibert |
| 4,486,983 A | 12/1984 | Sunnen et al. |
| 4,490,046 A | 12/1984 | Guibert |
| 4,491,596 A | 1/1985 | Elias |
| 4,497,846 A | 2/1985 | Boursier et al. |
| 4,505,375 A | 3/1985 | Kuster |
| 4,510,271 A | 4/1985 | Muhle et al. |
| 4,519,844 A | 5/1985 | Chaux et al. |
| 4,524,086 A | 6/1985 | Player et al. |
| 4,541,824 A | 9/1985 | Muller |
| 4,555,407 A | 11/1985 | Kramer et al. |
| 4,557,938 A | 12/1985 | Sander et al. |
| 4,562,076 A | 12/1985 | Arnold et al. |
| 4,579,738 A | 4/1986 | Cherukuri et al. |
| 4,587,125 A | 5/1986 | Cherukuri et al. |
| 4,599,002 A | 7/1986 | Gutknecht |
| 4,607,099 A | 8/1986 | Kanda et al. |
| 4,612,355 A | 9/1986 | Belz |
| 4,614,264 A | 9/1986 | Fishburne |
| 4,614,654 A | 9/1986 | Ream et al. |
| 4,619,834 A | 10/1986 | Zanno et al. |
| 4,656,039 A | 4/1987 | Weiss et al. |
| 4,659,014 A * | 4/1987 | Soth ................ B05B 17/063 239/102.2 |
| 4,671,961 A | 6/1987 | Patel et al. |
| 4,692,478 A | 9/1987 | Viswanathan et al. |
| 4,693,888 A | 9/1987 | Miyahara et al. |
| 4,711,784 A | 12/1987 | Yang |
| 4,724,151 A | 2/1988 | Mansukhani et al. |
| 4,728,515 A | 3/1988 | Patel et al. |
| 4,747,881 A | 5/1988 | Shaw et al. |
| 4,753,790 A | 6/1988 | Silva et al. |
| 4,757,892 A | 7/1988 | Wenger |
| 4,764,020 A | 8/1988 | Moriyama |
| 4,792,495 A | 12/1988 | Taniguchi et al. |
| 4,806,364 A | 2/1989 | Kubota et al. |
| 4,816,265 A | 3/1989 | Cherukuri et al. |
| 4,832,962 A | 5/1989 | Oppenheimer et al. |
| 4,840,491 A | 6/1989 | Hagiwara et al. |
| 4,850,842 A | 7/1989 | Van Alstine |
| 4,876,095 A | 10/1989 | Yang |
| 4,882,172 A | 11/1989 | Van Alstine |
| 4,882,175 A | 11/1989 | Ream et al. |
| 4,882,176 A | 11/1989 | Koyama et al. |
| 4,900,156 A | 2/1990 | Bauer |
| 4,906,102 A | 3/1990 | Schwarz et al. |
| 4,911,937 A | 3/1990 | Crosello et al. |
| 4,915,958 A | 4/1990 | Fanst et al. |
| 4,929,447 A | 5/1990 | Yang |
| 4,929,508 A | 5/1990 | Sharma et al. |
| 4,933,183 A | 6/1990 | Sharma et al. |
| 4,933,189 A | 6/1990 | Cherukuri |
| 4,933,190 A | 6/1990 | Cherukuri et al. |
| 4,935,242 A | 6/1990 | Sharma et al. |
| 4,940,594 A | 7/1990 | Van Alstine |
| 4,971,806 A | 11/1990 | Cherukuri et al. |
| 4,980,177 A | 12/1990 | Cherukuri et al. |
| 4,980,178 A | 12/1990 | Cherukuri et al. |
| 4,981,698 A | 1/1991 | Cherukuri et al. |
| 4,997,659 A | 3/1991 | Yatka et al. |
| 5,009,893 A | 4/1991 | Cherukuri et al. |
| 5,009,916 A | 4/1991 | Colliopoulos |
| 5,045,325 A | 9/1991 | Lesko et al. |
| 5,045,326 A | 9/1991 | Glass et al. |
| 5,085,872 A | 2/1992 | Patel et al. |
| 5,110,607 A | 5/1992 | Yang |
| 5,110,608 A | 5/1992 | Cherukuri et al. |
| 5,125,819 A | 6/1992 | Hager et al. |
| 5,126,151 A | 6/1992 | Bodor et al. |
| 5,128,155 A | 7/1992 | Song et al. |
| 5,135,760 A | 8/1992 | Degady et al. |
| 5,141,128 A | 8/1992 | Pippin |
| 5,158,725 A | 10/1992 | Handa et al. |
| 5,164,210 A | 11/1992 | Campbell et al. |
| 5,170,877 A | 12/1992 | Francioni |
| 5,171,589 A | 12/1992 | Richey et al. |
| 5,192,561 A | 3/1993 | Bunczek et al. |
| 5,192,562 A | 3/1993 | Grey et al. |
| 5,205,106 A | 4/1993 | Zimmermann et al. |
| 5,213,724 A | 5/1993 | Saatkamp |

(56) References Cited

U.S. PATENT DOCUMENTS

| | | |
|---|---|---|
| 5,217,735 A | 6/1993 | Zibell |
| 5,223,282 A | 6/1993 | Patel et al. |
| 5,227,154 A | 7/1993 | Reynolds |
| 5,229,148 A | 7/1993 | Copper |
| 5,236,720 A | 8/1993 | Cherukuri |
| 5,266,592 A | 11/1993 | Grub et al. |
| 5,283,021 A | 2/1994 | Shih |
| 5,286,502 A | 2/1994 | Meyers |
| 5,300,305 A | 4/1994 | Stapler et al. |
| 5,310,955 A | 5/1994 | Shirtum et al. |
| 5,324,530 A | 6/1994 | Kehoe et al. |
| 5,334,397 A | 8/1994 | Ream et al. |
| 5,344,664 A | 9/1994 | Fitch et al. |
| 5,366,740 A | 11/1994 | Shaw et al. |
| 5,378,131 A | 1/1995 | Greenberg |
| 5,384,144 A | 1/1995 | Bedard et al. |
| 5,397,580 A | 3/1995 | Song et al. |
| 5,405,623 A | 4/1995 | Barkalow et al. |
| 5,407,665 A | 4/1995 | McLaughlin et al. |
| 5,409,715 A | 4/1995 | Meyers |
| 5,419,919 A | 5/1995 | Song et al. |
| 5,425,962 A | 6/1995 | Johnson et al. |
| 5,429,827 A | 7/1995 | Song et al. |
| 5,433,960 A | 7/1995 | Meyers |
| 5,436,013 A | 7/1995 | Synosky et al. |
| 5,437,879 A | 8/1995 | Kabse et al. |
| 5,441,750 A | 8/1995 | Synosky et al. |
| 5,474,787 A | 12/1995 | Grey et al. |
| 5,478,593 A | 12/1995 | Serpelloni et al. |
| 5,486,366 A | 1/1996 | Song et al. |
| 5,494,685 A | 2/1996 | Tyrpin et al. |
| 5,520,457 A | 5/1996 | Gontero et al. |
| 5,523,097 A | 6/1996 | Song et al. |
| 5,538,742 A | 7/1996 | McHale et al. |
| 5,543,160 A | 8/1996 | Song et al. |
| 5,545,416 A | 8/1996 | Broderick et al. |
| 5,545,424 A | 8/1996 | Nakatsu |
| 5,547,689 A | 8/1996 | Ribadeau-Dumas et al. |
| 5,554,416 A | 9/1996 | Scheufler et al. |
| 5,562,936 A | 10/1996 | Song et al. |
| 5,567,450 A | 10/1996 | Zuromski et al. |
| 5,571,543 A | 11/1996 | Song et al. |
| 5,595,757 A | 1/1997 | Kiefer et al. |
| 5,601,858 A | 2/1997 | Mansukhani et al. |
| 5,611,420 A | 3/1997 | Heim et al. |
| 5,612,071 A | 3/1997 | Song et al. |
| 5,614,234 A | 3/1997 | Song et al. |
| 5,629,042 A | 5/1997 | Serpelloni et al. |
| 5,637,334 A | 6/1997 | Yatka et al. |
| 5,650,232 A | 7/1997 | Glenn et al. |
| 5,665,406 A | 9/1997 | Reed et al. |
| 5,679,389 A | 10/1997 | Wong et al. |
| 5,679,397 A | 10/1997 | Kuroda et al. |
| 5,698,181 A | 12/1997 | Luo |
| 5,714,119 A | 2/1998 | Kawagoe et al. |
| 5,733,583 A | 3/1998 | Muller |
| 5,756,020 A | 5/1998 | Locke et al. |
| 5,756,133 A | 5/1998 | Duggan et al. |
| 5,773,053 A | 6/1998 | Song et al. |
| 5,789,002 A | 8/1998 | Duggan et al. |
| 5,792,494 A | 8/1998 | Kanca et al. |
| 5,792,495 A | 8/1998 | Degady et al. |
| 5,800,847 A | 9/1998 | Song et al. |
| 5,820,821 A | 10/1998 | Kawagoe et al. |
| 5,827,549 A | 10/1998 | Rancich et al. |
| 5,837,302 A | 11/1998 | Degady et al. |
| 5,853,243 A | 12/1998 | Duggan et al. |
| 5,879,728 A | 3/1999 | Graff et al. |
| 5,908,645 A | 6/1999 | Townsend et al. |
| 5,915,524 A | 6/1999 | Horlacker |
| 5,925,387 A | 7/1999 | Gimmler et al. |
| 5,938,826 A | 8/1999 | Baker et al. |
| 5,944,266 A | 8/1999 | Degady et al. |
| 5,955,116 A | 9/1999 | Kehoe et al. |
| 5,955,123 A | 9/1999 | Daggy |
| 5,958,472 A | 9/1999 | Robinson et al. |
| 5,971,739 A | 10/1999 | Hoffman et al. |
| 5,972,392 A | 10/1999 | Kopecky et al. |
| 5,976,581 A | 11/1999 | Song et al. |
| 6,004,589 A | 12/1999 | Song et al. |
| 6,010,723 A | 1/2000 | Song et al. |
| 6,017,565 A | 1/2000 | Rancich et al. |
| 6,017,566 A | 1/2000 | Bunczek et al. |
| 6,030,647 A | 2/2000 | Song et al. |
| 6,045,855 A | 4/2000 | Lindqvist |
| 6,056,429 A | 5/2000 | Duggan et al. |
| 6,074,135 A | 6/2000 | Tapphorn et al. |
| 6,080,432 A | 6/2000 | Tyrpin |
| 6,086,925 A | 7/2000 | Song et al. |
| 6,103,159 A * | 8/2000 | Schutze ............... B05B 7/0475 264/109 |
| 6,159,509 A | 12/2000 | Johnson et al. |
| 6,168,306 B1 | 1/2001 | Degady et al. |
| 6,190,706 B1 | 2/2001 | Bunczek et al. |
| 6,200,608 B1 | 3/2001 | Gmunder et al. |
| 6,214,389 B1 | 4/2001 | Hoffman et al. |
| 6,221,421 B1 | 4/2001 | Wullschleger et al. |
| 6,235,318 B1 | 5/2001 | Lombardy, Jr. et al. |
| 6,238,710 B1 | 5/2001 | Song et al. |
| 6,254,373 B1 * | 7/2001 | Hoffman ............... A23G 4/02 425/327 |
| 6,270,826 B1 | 8/2001 | Kashulines, Jr. et al. |
| 6,277,385 B1 | 8/2001 | Luke |
| 6,280,780 B1 | 8/2001 | Degady et al. |
| 6,312,740 B1 | 11/2001 | Roberts |
| 6,314,389 B2 | 11/2001 | Milsom |
| 6,350,480 B1 | 2/2002 | Urnezis et al. |
| 6,375,448 B1 | 4/2002 | Duggan et al. |
| 6,436,326 B1 | 8/2002 | Keillor, III |
| 6,436,461 B1 | 8/2002 | Bouwmeesters et al. |
| 6,436,899 B2 | 8/2002 | Portman |
| 6,440,240 B1 | 8/2002 | Ohman |
| 6,440,472 B1 | 8/2002 | Song et al. |
| 6,444,240 B1 | 9/2002 | Barkalow et al. |
| 6,455,080 B1 | 9/2002 | Wolf et al. |
| 6,458,427 B2 | 10/2002 | Bertellotti et al. |
| 6,468,962 B1 | 10/2002 | Portman |
| 6,471,945 B2 | 10/2002 | Luo et al. |
| 6,479,071 B2 | 11/2002 | Holme et al. |
| 6,485,739 B2 | 11/2002 | Luo et al. |
| 6,551,643 B2 | 4/2003 | Bernatz et al. |
| 6,555,146 B1 | 4/2003 | Rapp et al. |
| 6,558,690 B2 | 5/2003 | Portman |
| 6,558,752 B2 | 5/2003 | Bellemare et al. |
| 6,562,382 B1 | 5/2003 | Corriveau et al. |
| 6,578,232 B2 | 6/2003 | Salice |
| 6,592,884 B2 | 7/2003 | Hofmann et al. |
| 6,601,708 B1 | 8/2003 | Degady et al. |
| 6,620,243 B1 | 9/2003 | Bertellotti et al. |
| 6,623,266 B2 | 9/2003 | Jani et al. |
| 6,627,233 B1 | 9/2003 | Wolf et al. |
| 6,630,182 B1 | 10/2003 | Warrington et al. |
| 6,685,916 B1 | 2/2004 | Holme et al. |
| 6,696,044 B2 | 2/2004 | Luo et al. |
| 6,716,815 B2 | 4/2004 | Portman |
| 6,733,818 B2 | 5/2004 | Luo et al. |
| 6,743,453 B2 | 6/2004 | Warrington et al. |
| 6,759,066 B2 | 7/2004 | Savage et al. |
| 6,773,716 B2 | 8/2004 | Ream et al. |
| 6,773,730 B1 | 8/2004 | Liu et al. |
| 6,776,288 B2 | 8/2004 | Kopecky |
| 6,780,443 B1 | 8/2004 | Nakatsu et al. |
| 6,783,783 B2 | 8/2004 | Clark et al. |
| 6,803,061 B1 | 10/2004 | Foster |
| 6,811,797 B1 | 11/2004 | Wolfe et al. |
| 6,838,431 B2 | 1/2005 | Portman |
| 6,846,500 B1 | 1/2005 | Luo et al. |
| 6,858,237 B1 | 2/2005 | Wolfe et al. |
| 6,878,390 B2 | 4/2005 | Murray et al. |
| 6,964,779 B1 * | 11/2005 | Hayakawa ............ A61J 3/10 424/464 |
| 6,974,597 B2 | 12/2005 | Ohta et al. |
| 7,022,352 B2 | 4/2006 | Castro et al. |
| 7,030,273 B1 | 4/2006 | Sun |

(56) References Cited

U.S. PATENT DOCUMENTS

| | | | |
|---|---|---|---|
| 7,087,254 B1 | 8/2006 | Wolfe et al. | |
| 7,115,288 B2 | 10/2006 | Witkewitz et al. | |
| 7,189,760 B2 | 3/2007 | Erman et al. | |
| 7,244,454 B1 | 7/2007 | Zyck et al. | |
| 7,438,942 B2 | 10/2008 | Ortiz De Zaratte et al. | |
| 7,442,026 B2 | 10/2008 | Shulski et al. | |
| 7,537,792 B2 | 5/2009 | Niekerk et al. | |
| 7,578,874 B2 | 8/2009 | Benjamin et al. | |
| 7,581,872 B2 | 9/2009 | Allen | |
| 7,637,999 B2 | 12/2009 | Struschka et al. | |
| 7,641,926 B2 | 1/2010 | Kabse et al. | |
| 7,732,020 B2 | 6/2010 | King et al. | |
| 7,736,681 B2 | 6/2010 | Belzowski et al. | |
| 7,771,182 B2 | 8/2010 | Fornaguera | |
| 7,786,191 B2 | 8/2010 | De Koning et al. | |
| 7,810,446 B2 | 10/2010 | Degady et al. | |
| 8,114,211 B2 | 2/2012 | Handrosch et al. | |
| 8,226,401 B2 | 7/2012 | Olejarski et al. | |
| 9,060,526 B2 | 6/2015 | Jani | |
| 2001/0001512 A1* | 5/2001 | Voss | B05B 7/066 264/112 |
| 2001/0002274 A1 | 5/2001 | Lessmeister et al. | |
| 2002/0028276 A1 | 3/2002 | Rapp et al. | |
| 2002/0034592 A1 | 3/2002 | Hogan et al. | |
| 2002/0038160 A1 | 3/2002 | Maynard et al. | |
| 2002/0058102 A1 | 5/2002 | Makela et al. | |
| 2002/0114863 A1 | 8/2002 | Ream et al. | |
| 2002/0192330 A1 | 12/2002 | Bunkers et al. | |
| 2002/0197388 A1 | 12/2002 | Brown et al. | |
| 2003/0044486 A1 | 3/2003 | Wargocki et al. | |
| 2003/0072842 A1 | 4/2003 | Johnson et al. | |
| 2003/0099741 A1 | 5/2003 | Gubler | |
| 2003/0124228 A1 | 7/2003 | Goto et al. | |
| 2003/0124234 A1 | 7/2003 | Hayashi et al. | |
| 2003/0157213 A1 | 8/2003 | Jenkins | |
| 2003/0161914 A1 | 8/2003 | Sault et al. | |
| 2003/0185961 A1 | 10/2003 | Sault et al. | |
| 2003/0190397 A1 | 10/2003 | Serpelloni | |
| 2003/0215417 A1 | 11/2003 | Uchiyama et al. | |
| 2004/0081713 A1 | 4/2004 | Maxwell et al. | |
| 2004/0096544 A1 | 5/2004 | Yatka et al. | |
| 2004/0234648 A1 | 11/2004 | Mazurek et al. | |
| 2005/0008732 A1 | 1/2005 | Gebreselassie et al. | |
| 2005/0008747 A1 | 1/2005 | Barkalow et al. | |
| 2005/0025721 A1 | 2/2005 | Holme et al. | |
| 2005/0047267 A1 | 3/2005 | Gneuss et al. | |
| 2005/0091873 A1 | 5/2005 | Maryakhin | |
| 2005/0112236 A1 | 5/2005 | Boghani et al. | |
| 2005/0202118 A1 | 9/2005 | Johnson et al. | |
| 2005/0265930 A1 | 12/2005 | Erman et al. | |
| 2005/0266091 A1 | 12/2005 | Lyons et al. | |
| 2006/0019005 A1 | 1/2006 | Talbot | |
| 2006/0024425 A1 | 2/2006 | Barkalow et al. | |
| 2006/0034975 A1 | 2/2006 | Schechner et al. | |
| 2006/0039872 A1 | 2/2006 | Schmidt | |
| 2006/0045934 A1 | 3/2006 | Kabse et al. | |
| 2006/0057276 A1 | 3/2006 | Carcasona et al. | |
| 2006/0078508 A1 | 4/2006 | Gebreselassie et al. | |
| 2006/0147585 A1 | 7/2006 | Winckelmann et al. | |
| 2006/0165833 A1 | 7/2006 | Muschalik et al. | |
| 2006/0228451 A1 | 10/2006 | Martin | |
| 2006/0280834 A1 | 12/2006 | Jani et al. | |
| 2006/0286220 A1 | 12/2006 | King | |
| 2006/0292271 A1 | 12/2006 | King | |
| 2007/0065557 A1 | 3/2007 | Pandey et al. | |
| 2007/0076170 A1 | 4/2007 | Lin et al. | |
| 2007/0082026 A1 | 4/2007 | Aimutis, Jr. et al. | |
| 2007/0141198 A1 | 6/2007 | Yang | |
| 2007/0148284 A1 | 6/2007 | Jani et al. | |
| 2007/0160707 A1 | 7/2007 | Garcia | |
| 2007/0218165 A1 | 9/2007 | Castro et al. | |
| 2007/0224311 A1 | 9/2007 | Grey et al. | |
| 2007/0231424 A1 | 10/2007 | Castro et al. | |
| 2007/0231425 A1 | 10/2007 | Ream et al. | |
| 2007/0269577 A1 | 11/2007 | Pershad et al. | |
| 2008/0014302 A1 | 1/2008 | Elejalde et al. | |
| 2008/0050605 A1 | 2/2008 | Rapp et al. | |
| 2008/0057154 A1 | 3/2008 | Acar | |
| 2008/0057155 A1 | 3/2008 | Luo et al. | |
| 2008/0063748 A1 | 3/2008 | Massey et al. | |
| 2008/0075830 A1 | 3/2008 | Wen et al. | |
| 2008/0085354 A1 | 4/2008 | Paeschke et al. | |
| 2008/0107771 A1 | 5/2008 | Fabre et al. | |
| 2008/0152756 A1 | 6/2008 | Ream et al. | |
| 2008/0159921 A1 | 7/2008 | Mizumoto et al. | |
| 2008/0166449 A1 | 7/2008 | Kabse et al. | |
| 2008/0166477 A1 | 7/2008 | Rowe et al. | |
| 2008/0178802 A1 | 7/2008 | Sakakibara et al. | |
| 2008/0199564 A1 | 8/2008 | Boghani et al. | |
| 2008/0241319 A1 | 10/2008 | Pandey et al. | |
| 2008/0265055 A1* | 10/2008 | Quan | B05B 17/0623 239/102.1 |
| 2008/0265056 A1 | 10/2008 | Quan et al. | |
| 2009/0029018 A1 | 1/2009 | Elejalde et al. | |
| 2009/0053390 A1 | 2/2009 | Sakou et al. | |
| 2009/0074924 A1 | 3/2009 | Scudieri et al. | |
| 2009/0130251 A1 | 5/2009 | Perry et al. | |
| 2009/0135100 A1 | 5/2009 | Kim et al. | |
| 2009/0142444 A1 | 6/2009 | Jarrard, Jr. et al. | |
| 2009/0155423 A1 | 6/2009 | Moore et al. | |
| 2009/0162475 A1 | 6/2009 | Duggan et al. | |
| 2009/0214719 A1 | 8/2009 | Gouin et al. | |
| 2009/0220656 A1 | 9/2009 | Fabre et al. | |
| 2009/0238027 A1 | 9/2009 | Yamaguchi et al. | |
| 2009/0280211 A1 | 11/2009 | Friedman et al. | |
| 2009/0327276 A1 | 12/2009 | Thurlow et al. | |
| 2010/0055264 A1 | 3/2010 | Liniger et al. | |
| 2010/0055280 A1 | 3/2010 | Simon | |
| 2010/0062867 A1 | 3/2010 | Chen | |
| 2010/0077956 A1 | 4/2010 | Zuehlke et al. | |
| 2010/0136165 A1 | 6/2010 | Miladinov et al. | |
| 2010/0166934 A1 | 7/2010 | Caiger et al. | |
| 2010/0233332 A1 | 9/2010 | Xing et al. | |
| 2011/0052756 A1 | 3/2011 | Cervenka et al. | |
| 2011/0104330 A1 | 5/2011 | Colle et al. | |
| 2011/0178382 A1 | 7/2011 | Topp | |
| 2011/0183044 A1* | 7/2011 | Zimmermann | A23G 3/0023 426/90 |
| 2011/0256305 A1 | 10/2011 | Jacques et al. | |
| 2012/0207875 A1 | 8/2012 | Aldridge et al. | |
| 2012/0207888 A1 | 8/2012 | King | |
| 2012/0229325 A1 | 9/2012 | Dutruc | |
| 2012/0234942 A1 | 9/2012 | Unosawa et al. | |
| 2013/0055907 A1 | 3/2013 | Brandt, Jr. et al. | |
| 2013/0202734 A1 | 8/2013 | Jani et al. | |
| 2013/0209605 A1 | 8/2013 | Adivi et al. | |
| 2013/0209606 A1 | 8/2013 | Boudy et al. | |
| 2013/0209644 A1 | 8/2013 | Miladinov et al. | |
| 2013/0216661 A1 | 8/2013 | Miladinov et al. | |
| 2014/0004224 A1 | 1/2014 | Jani et al. | |
| 2014/0287091 A1 | 9/2014 | Jani et al. | |
| 2014/0302195 A1 | 10/2014 | Jani et al. | |
| 2014/0302196 A1 | 10/2014 | Jani et al. | |
| 2015/0250202 A1 | 9/2015 | Jani | |
| 2016/0205965 A1 | 7/2016 | Elejalde et al. | |
| 2016/0324183 A1 | 11/2016 | Jani | |
| 2016/0330993 A1* | 11/2016 | Grant | A23G 4/04 |
| 2017/0059749 A1 | 3/2017 | Wakatsuki | |
| 2017/0071226 A1 | 3/2017 | Modak | |
| 2017/0099854 A1 | 4/2017 | Mecrin et al. | |
| 2017/0251693 A1 | 9/2017 | Miladinov et al. | |
| 2017/0258107 A1 | 9/2017 | Miladinov et al. | |
| 2017/0265493 A1 | 9/2017 | Miladinov et al. | |

FOREIGN PATENT DOCUMENTS

| | | |
|---|---|---|
| DE | 3933745 A1 | 4/1991 |
| EP | 0150934 A2 | 7/1985 |
| EP | 0231984 A2 | 8/1987 |
| EP | 0273809 A2 | 7/1988 |
| EP | 0657101 A1 | 6/1995 |
| EP | 0732057 A1 | 9/1996 |
| EP | 0941768 A2 | 9/1999 |
| EP | 0979714 A1 | 2/2000 |

(56) References Cited

FOREIGN PATENT DOCUMENTS

| | | |
|---|---|---|
| EP | 1264544 A2 | 12/2002 |
| EP | 0759703 B1 | 9/2003 |
| EP | 1410718 A1 | 4/2004 |
| EP | 1514483 A1 | 3/2005 |
| EP | 1061814 B1 | 8/2006 |
| EP | 2206437 A1 | 7/2010 |
| EP | 2260717 A1 | 12/2010 |
| EP | 2774492 A2 | 9/2014 |
| FR | 2350146 A2 | 12/1977 |
| FR | 2635441 A1 | 2/1990 |
| GB | 359458 | 10/1931 |
| GB | 639695 | 7/1950 |
| GB | 746101 A | 3/1956 |
| GB | 831028 | 3/1960 |
| GB | 1441446 A | 6/1976 |
| GB | 1497507 A | 1/1978 |
| GB | 2034572 A | 6/1980 |
| GB | 2042969 A | 10/1980 |
| GB | 2120517 A | 12/1983 |
| GB | 2124468 A | 2/1984 |
| JP | S4706226 Y1 | 3/1972 |
| JP | S52082756 A | 7/1977 |
| JP | S52082758 A | 7/1977 |
| JP | S54049367 A | 4/1979 |
| JP | S55135548 A | 10/1980 |
| JP | S5862898 U | 4/1983 |
| JP | S58111644 A | 7/1983 |
| JP | S59163381 | 11/1984 |
| JP | S6128391 U | 2/1986 |
| JP | S61181367 A | 8/1986 |
| JP | S62205753 A | 9/1987 |
| JP | S62224275 A | 10/1987 |
| JP | S63177758 A | 7/1988 |
| JP | S63273438 A | 11/1988 |
| JP | 02286307 A | 11/1990 |
| JP | H04179445 A | 6/1992 |
| JP | H04215867 A | 8/1992 |
| JP | H0646760 A | 2/1994 |
| JP | H06189689 A | 7/1994 |
| JP | 07067554 A | 3/1995 |
| JP | H07233046 A | 9/1995 |
| JP | H0923862 A | 1/1997 |
| JP | H09065833 A | 3/1997 |
| JP | 2000004792 A | 1/2000 |
| JP | 2000166477 A | 6/2000 |
| JP | 2002017266 A | 1/2002 |
| JP | 2002045117 A | 2/2002 |
| JP | 2002176904 A | 6/2002 |
| JP | 2004141004 A | 5/2004 |
| JP | 2004314106 A | 11/2004 |
| JP | 2004321096 A | 11/2004 |
| JP | 2006102571 A | 4/2006 |
| JP | 2006204185 A | 8/2006 |
| JP | 2006345781 A | 12/2006 |
| JP | 2007000798 A | 1/2007 |
| JP | 2007028951 A | 2/2007 |
| JP | 2007029018 A | 2/2007 |
| JP | 2007215450 A | 8/2007 |
| JP | 2008539804 A | 11/2008 |
| JP | 4461255 B2 | 5/2010 |
| JP | 4711754 B2 | 6/2011 |
| KR | 20090039105 | 4/2009 |
| RU | 2214720 C2 | 10/2003 |
| RU | 2325071 C1 | 5/2008 |
| SU | 839470 A1 | 6/1981 |
| WO | 9734708 A1 | 9/1997 |
| WO | 9944436 A1 | 9/1999 |
| WO | 9945791 A1 | 9/1999 |
| WO | 0033971 A1 | 6/2000 |
| WO | 200217851 A2 | 3/2002 |
| WO | 03047360 A1 | 6/2003 |
| WO | 2004073691 A1 | 9/2004 |
| WO | 2004112971 A1 | 12/2004 |
| WO | 2005089255 A2 | 9/2005 |
| WO | 2006125334 A1 | 11/2006 |
| WO | 2006127277 A2 | 11/2006 |
| WO | 2007076170 A2 | 7/2007 |
| WO | 2009036954 A1 | 3/2009 |
| WO | 2009070570 A1 | 6/2009 |
| WO | 2009108769 A2 | 9/2009 |
| WO | 2009135100 A1 | 11/2009 |
| WO | 2009140351 A2 | 11/2009 |
| WO | 2010006385 A1 | 1/2010 |
| WO | 2010084759 A1 | 7/2010 |
| WO | 2010092480 A1 | 8/2010 |
| WO | 2011044373 A2 | 4/2011 |
| WO | 2011063082 A2 | 5/2011 |
| WO | 2011084759 A2 | 7/2011 |
| WO | 2011154398 A1 | 12/2011 |
| WO | 2011159935 A1 | 12/2011 |
| WO | 2013013045 A2 | 1/2013 |
| WO | 2013049800 A2 | 4/2013 |

OTHER PUBLICATIONS

JP 2nd Office Action with translation, JP Application No. 2011-538074; dated Aug. 20, 2013, pp. 1-3.
JP 2nd Office Action with translation, JP Application No. 2011-538658; dated Aug. 6, 2013, pp. 1-6.
JP 2nd Office Action with translation, JP Application No. 2011-538659; dated Feb. 4, 2014, pp. 1-6.
JP 2nd Office Action with translation, JP Application No. 2012-549982; dated Mar. 4, 2014, pp. 1-3.
JP 2nd Office Action with translation, JP Application No. 2013-513299; dated Oct. 14, 2014, pp. 1-5.
JP 2nd Office Action with translation, JP Application No. 2013-513302; dated Oct. 14, 2014, pp. 1-4.
JP 2nd Office Action with translation, JP Application No. 2013-557853; dated Jun. 2, 2015, pp. 1-6.
JP 2nd Office Action with translation, JP Application No. 2014-521785; dated Nov. 10, 2015, pp. 1-4.
JP 2nd Office Action with translation, JP Application No. 2014-521788; dated Nov. 10, 2015, pp. 1-4.
JP 2nd Office Action with translation, JP Application No. 2014-521789; dated Oct. 6, 2015, pp. 1-4.
JP 3rd Office Action with translation, JP Application No. 2011-538074; dated Apr. 7, 2015, pp. 1-9.
JP 3rd Office Action with translation, JP Application No. 2011-538658; dated May 7, 2014, pp. 1-7.
JP 3rd Office Action with translation, JP Application No. 2011-538659; dated Nov. 25, 2014, pp. 1-3.
JP 3rd Office Action with translation, JP Application No. 2014-521785; dated Feb. 28, 2017, pp. 1-11.
JP 3rd Office Action with translation, JP Application No. 2014-521788; dated May 9, 2017, pp. 1-25.
JP Notice of Allowance with translation; JP Application No. 2012-549982; dated Oct. 7, 2014, pp. 1-4.
JP OA with translation Application No. 2016-559836 dated Sep. 4, 2017, pp. 1-14.
JP OA with translation Application No. 2016-562229 dated Sep. 21, 2017, pp. 1-7.
JP Pre-Appeal Report with translation, JP Application No. 2013-557853; dated Dec. 15, 2015, pp. 1-5.
JPD 1st Office Action with translation, JP Application No. 2014-139188; dated Jul. 28, 2015, pp. 1-4.
JPD 1st Office Action with translation, JP Application No. 2015-196927; dated Jul. 12, 2016, pp. 1-11.
JPD 2nd Office Action with translation, JP Application No. 2014-139188; dated Jan. 19, 2016, pp. 1-5.
JPD 2nd Office Action with translation, JP Application No. 2015-196927; dated May 9, 2017, pp. 1-9.
Mexican 1st Office Action with translation, MX Application No. MX/a/2013/010024; dated Jul. 29, 2015, pp. 4.
Mexican Office Action with Translation; MX Application No. MX/a/2014/000794; dated Nov. 3, 2017, pp. 1-9.
Michael J. Lynch, "Soft Panning," The Manufacturing Confectioner, pp. 47-50, Nov. 1987.

(56) References Cited

OTHER PUBLICATIONS

MX 1st Office Action and Translation; Mexican Application No. MX/a/2014/000795; dated Oct. 31, 2017; pp. 1-11.
MX 1st Office Action and Translation; Mexican Application No. MX/a/2014/000819; dated Oct. 23, 2017; pp. 1-7.
MX 1st Office Action with translation; Mexican Patent Application No. MX/a/2012/008505; dated Aug. 7, 2015, pp. 1-7.
MX 1st Office Action; Mexican Patent Application No. MX/a/2011/005647; dated Aug. 30, 2013, pp. 1-7.
MX 1st Office Action; Mexican Patent Application No. MX/a/2011/005652; dated Jun. 17, 2015, pp. 1-12.
MX 1st Office Action; Mexican Patent Application No. MX/a/2011/005693; dated Jul. 17, 2013, pp. 1-3.
MX 1st Office Action; Mexican Patent Application No. MX/a/2012/013889; dated Jan. 27, 2016, pp. 1-4.
MX 1st Office Action; Mexican Patent Application No. MX/a/2012/013982; dated Jan. 21, 2016, pp. 1-5.
MX 2nd Office Action with translation; Mexican Patent Application No. MX/a/2012/008505; dated Feb. 19, 2016, pp. 1-7.
MX 2nd Office Action; Mexican Patent Application No. MX/a/2011/005652; dated Sep. 23, 2015, pp. 1-4.
MX 3rd Office Action with translation; Mexican Patent Application No. MX/a/2012/008505; dated Oct. 25, 2016, pp. 1-9.
MX 4th Office Action with translation; Mexican Patent Application No. MX/a/2012/008505; dated Jun. 27, 2017, pp. 1-7.
Non-Final Office Action issued in U.S. Appl. No. 12/338,428 dated Mar. 17, 2014.
Non-Final Office Action issued in U.S. Appl. No. 12/338,428 dated Apr. 12, 2011.
Non-Final Office Action issued in U.S. Appl. No. 12/338,682 dated Jan. 16, 2013.
Non-Final Office Action issued in U.S. Appl. No. 12/338,682 dated Sep. 26, 2014.
Non-Final Office Action issued in U.S. Appl. No. 12/338,682 dated Nov. 23, 2011.
Non-Final Office Action; U.S. Appl. No. 14/430,083, filed Mar. 20, 2015; Advanced Gum Forming; Notitification Date: Oct. 19, 2017; 21 Pages.
Notice of Allowance issued in U.S. Appl. No. 12/338,428 dated Nov. 18, 2015.
PCT Invitation to Pay Additional Fees and, Where applicable, Protest Fee; PCT International Applciation No. PCT/US2012/028232; International Filing Date: Mar. 8, 2012, dated Aug. 27, 2012, pp. 1-8.
PCT Invitation to Pay Additional Fees and, Where applicable, Protest Fee; PCT International Applciation No. PCT/US2012/047404; International Filing Date: Jul. 19, 2012, dated Nov. 21, 2012, pp. 1-8.
PCT Invitation to Pay Additional Fees and, Where applicable, Protest Fee; PCT International Applciation No. PCT/US2012/047409; International Filing Date: Jul. 19, 2012, dated Nov. 26, 2012, pp. 1-9.
PCT Invitation to Pay Additional Fees and, Where applicable, Protest Fee; PCT International Applciation No. PCT/US2012/047411, International Filing Date: Jul. 19, 2012, dated Nov. 26, 2012, pp. 1-8.
EP Communication under Rule 71(3) EPC; Application No. 10 250 033.7-2114; dated Jul. 23, 2012; pp. 1-5.
EP Communication under Rule 71(3) EPC; Application No. 11 726 558.7-1358; dated Dec. 9, 2015, pp. 1-9.
EP Communication under Rule 71(3) EPC; Application No. 11 781 895.5-13588; dated Jul. 29, 2015, pp. 1-7.
EP Communication under Rule 71(3) EPC; Application No. 13 771 024.0-1375; dated Apr. 28, 2017; pp. 1-7.
EP Communication under Rule 94(3) EPC; Application No. 10 250 033.7-2114; dated Feb. 10, 2011; pp. 1-7.
EP Communication under Rule 94(3) EPC; Application No. 10 250 033.7-2114; dated Mar. 19, 2012; pp. 1-3.
EP Communication under Rule 94(3) EPC; Application No. 14 723 283.9-1375; dated Feb. 6, 2017; pp. 1-2.

EP Communication; Extended European Search Report; Application No. 10844138.7-1357/2525667 PCT/US2010051085; dated Oct. 14, 2013; pp. 1-7.
Final Rejection issued in U.S. Appl. No. 12/338,428 dated Sep. 12, 2014.
Final Rejection issued in U.S. Appl. No. 12/338,428 dated Nov. 25, 2011.
Final Rejection issued in U.S. Appl. No. 12/338,682 dated Apr. 30, 2012.
Final Rejection issued in U.S. Appl. No. 12/338,682 dated Jul. 23, 2013.
Final Rejection issued in U.S. Appl. No. 12/338,682 dated Mar. 25, 2014.
Food Protection Committee, "Chemicals Used in Food Processing", National Academy of Sciences, 1965, pp. 1-101.
International Preliminary Report on Patentability issued in PCT/US2008/087618 dated Jun. 22, 2010.
International Preliminary Report on Patentability issued in PCT/US2008/087625 dated Jun. 22, 2010.
International Preliminary Report on Patentability issued in PCT/US2014/052614 dated Mar. 1, 2016.
International Search Report; International Application No. PCT/US2010/051085; International Filing Date: Oct. 1, 2010, dated Jun. 29, 2011, pp. 1-7.
International Search Report; International Application No. PCT/US2014/052614; International Filing Date: Aug. 26, 2014; dated Nov. 20, 2014; 4 Pages.
Invitation to Pay Additional Fees and, Where Applicable, Protect Fee; International Application No. PCT/US2009/065594; dated Mar. 30, 2010, pp. 1-31.
IPRP; International Application No. PCT/IB2009/007718; International Filing Date: Nov. 24, 2009, Date of Mailing: May 31, 2011, pp. 1-5.
IPRP; International Application No. PCT/US2009/065594; International Filing Date: Nov. 24, 2009, Date of Mailing: Sep. 27, 2011, pp. 1-8.
IPRP; International Application No. PCT/US2011/038738; International Filing Date: Jun. 1, 2011, Date of Mailing: Dec. 4, 2012, pp. 1-7.
IPRP; International Application No. PCT/US2011/038747; International Filing Date: Jun. 1, 2011, Date of Mailing: Dec. 4, 2012, pp. 1-9.
IPRP; International Application No. PCT/US2012/047404; International Filing Date: Jul. 19, 2012, Date of Mailing: Jan. 21, 2014, pp. 1-11.
IPRP; International Application No. PCT/US2014/072708; International Filing Date: Dec. 30, 2014, Date of Mailing: Jul. 5, 2016, pp. 1-7.
IPRP; International Application No. PCT/US2015/018072; International Filing Date: Feb. 27, 2015, Date of Mailing: Sep. 6, 2016, pp. 1-9.
IPRP; International Application No. PCT/US2015/031074; International Filing Date: May 15, 2015, Date of Mailing: Nov. 22, 2016, pp. 1-7.
IPRP; International Application No. PCT/US2015/031742; International Filing Date: May 20, 2015, Date of Mailing: Nov. 22, 2016, pp. 1-9.
Japanese Office Action with Translation; JP Application No. 2016-535722; dated Nov. 14, 2017; pp. 1-5.
John Flanyak, "Panning Technology, An Overview," The Manufacturing Confectioner, pp. 65-74, Jan. 1998.
JP 1st Office Action with translation, JP Application No. 2011-538074; dated Feb. 5, 2013, pp. 1-7.
JP 1st Office Action with translation, JP Application No. 2011-538658; dated Feb. 5, 2013, pp. 1-7.
JP 1st Office Action with translation, JP Application No. 2011-538659; dated Feb. 19, 2013, pp. 1-6.
JP 1st Office Action with translation, JP Application No. 2012-549982; dated Sep. 17, 2013, pp. 1-4.
JP 1st Office Action with translation, JP Application No. 2013-256761; dated Mar. 10, 2015, pp. 1-6.
JP 1st Office Action with translation, JP Application No. 2013-513299; dated Feb. 4, 2014, pp. 1-7.

(56) References Cited

OTHER PUBLICATIONS

JP 1st Office Action with translation, JP Application No. 2013-513302; dated Feb. 4, 2014, pp. 1-7.
JP 1st Office Action with translation, JP Application No. 2013-557853; dated Nov. 18, 2014, pp. 1-8.
JP 1st Office Action with translation, JP Application No. 2014-171916; dated Oct. 13, 2015, pp. 1-4.
JP 1st Office Action with translation, JP Application No. 2014-521785; dated Feb. 3, 2015, pp. 1-7.
JP 1st Office Action with translation, JP Application No. 2014-521788; dated Jan. 13, 2015, pp. 1-7.
JP 1st Office Action with translation, JP Application No. 2014-521789; dated Jan. 20, 2015, pp. 1-5.
JP 1st Office Action with translation, JP Application No. 2015-527688; dated Feb. 3, 2016, pp. 1-10.
JP 1st Office Action with translation, JP Application No. 2016-045354; dated Jan. 17, 2017, pp. 1-7.
JP 1st Office Action with translation, JP Application No. 2016-045867; dated Jan. 17, 2017, pp. 1-6.
JP 1st Office Action with translation, JP Application No. 2016-130735; dated Apr. 25, 2017, pp. 1-11.
JP 1st Office Action with translation, JP Application No. 2016-249450; dated Jan. 9, 2018, pp. 1-4.
JP 1st Office Action with translation, JP Application No. 2016-535722; dated Mar. 29, 2017, pp. 1-8.
JP 1st Office Action with translation, JP Application No. 2016-535710; dated May 25, 2017, pp. 1-5.
PCT Invitation to Pay Additional Fees and, Where applicable, Protest Fee; PCT International Applciation No. PCT/US2015/031742; International Filing Date: May 20, 2015, dated Sep. 18, 2015, pp. 1-6.
PCT IPRP; International Application No. PCT/US2010/051085; International Filing Date: Oct. 1, 2010, Date of Mailing: Aug. 2, 2012; pp. 1-8.
PCT IPRP; International Application No. PCT/US2012/028232; International Filing Date: Mar. 8, 2012, Date of Mailing: Sep. 17, 2013, pp. 1-10.
PCT IPRP; International Application No. PCT/US2012/047409; International Filing Date: Jul. 19, 2012, Date of Mailing: Jan. 21, 2014; pp. 1-10.
PCT IPRP; International Application No. PCT/US2012/047411; International Filing Date: Jul. 19, 2012, Date of Mailing: Jan. 21, 2014; pp. 1-11.
PCT IPRP; International Application No. PCT/US2013/060584; International Filing Date: Sep. 19, 2013, Date of Mailing: Mar. 24, 2015; pp. 1-6.
PCT IPRP; International Application No. PCT/US2014/034032; International Filing Date: Apr. 14, 2014, Date of Mailing: Oct. 20, 2015; pp. 1-9.
PCT IPRP; International Application No. PCT/US2014/072702; International Filing Date: Dec. 30, 2014, Date of Mailing: Jul. 5, 2016, pp. 1-11.
PCT Notification of Transmittal of The International Search Report; International Application No. PCT/IB2009/007718; International Filing Date: Nov. 24, 2009, dated May 21, 2010, pp. 1-6.
PCT Notification of Transmittal of The International Search Report; International Application No. PCT/US2009/065594; International Filing Date: Nov. 24, 2009, dated Sep. 22, 2011, pp. 1-6.
PCT Notification of Transmittal of The International Search Report; International Application No. PCT/US2011/038738; International Filing Date: Jun. 1, 2011, dated Feb. 6, 2012, pp. 1-5.
PCT Notification of Transmittal of The International Search Report; International Application No. PCT/US2011/038747; International Filing Date: Jun. 1, 2011, dated Sep. 6, 2011, pp. 1-5.
PCT Notification of Transmittal of The International Search Report; International Application No. PCT/US2012/028232; International Filing Date: Mar. 8, 2012, dated Nov. 16, 2012, pp. 1-7.
PCT Notification of Transmittal of The International Search Report; International Application No. PCT/US2012/047404; International Filing Date: Jul. 19, 2012, dated Feb. 27, 2013, pp. 1-8.
PCT Notification of Transmittal of The International Search Report; International Application No. PCT/US2012/047409; International Filing Date: Jul. 19, 2012, dated Feb. 27, 2013, pp. 1-8.
PCT Notification of Transmittal of The International Search Report; International Application No. PCT/US2012/047411; International Filing Date: Jul. 19, 2012, dated Feb. 27, 2013, pp. 1-7.
PCT Notification of Transmittal of The International Search Report; International Application No. PCT/US2013/060584; International Filing Date: Sep. 19, 2013, dated Nov. 25, 2013, pp. 1-5.
PCT Notification of Transmittal of The International Search Report; International Application No. PCT/US2014/034032; International Filing Date: Apr. 14, 2014, dated Sep. 8, 2014, pp. 1-17.
PCT Notification of Transmittal of The International Search Report; International Application No. PCT/US2014/072702; International Filing Date: Dec. 30, 2014, dated Mar. 16, 2015, pp. 1-5.
PCT Notification of Transmittal of The International Search Report; International Application No. PCT/US2014/072708; International Filing Date: Dec. 30, 2014, dated Mar. 3, 2015, pp. 1-4.
PCT Notification of Transmittal of The International Search Report; International Application No. PCT/US2015/018072; International Filing Date: Feb. 27, 2015, dated Jun. 17, 2015, pp. 1-6.
PCT Notification of Transmittal of The International Search Report; International Application No. PCT/US2015/031074; International Filing Date: May 15, 2015, dated Sep. 15, 2015, pp. 1-5.
PCT Notification of Transmittal of The International Search Report; International Application No. PCT/US2015/031742; International Filing Date: May 20, 2015, dated Dec. 16, 2015, pp. 1-7.
PCT Written Opinion; International Application No. PCT/IB2009/007718; International Filing Date: Nov. 24, 2009, dated May 21, 2010, pp. 1-4.
PCT Written Opinion; International Application No. PCT/US2009/065594; International Filing Date: Nov. 24, 2009, dated Sep. 22, 2011, pp. 1-7.
PCT Written Opinion; International Application No. PCT/US2011/038738; International Filing Date: Jun. 1, 2011, dated Feb. 6, 2012, pp. 1-7.
PCT Written Opinion; International Application No. PCT/US2011/038747; International Filing Date: Jun. 1, 2011, dated Sep. 6, 2011, pp. 1-7.
PCT Written Opinion; International Application No. PCT/US2012/028232; International Filing Date: Mar. 8, 2012, dated Nov. 16, 2012, pp. 1-10.
PCT Written Opinion; International Application No. PCT/US2012/047404; International Filing Date: Jul. 19, 2012, dated Feb. 27, 2013, pp. 1-11.
PCT Written Opinion; International Application No. PCT/US2012/047411; International Filing Date: Jul. 19, 2012, dated Feb. 27, 2013, pp. 1-11.
PCT Written Opinion; International Application No. PCT/US2013/060584; International Filing Date: Sep. 19, 2013, dated Nov. 25, 2013, pp. 1-6.
PCT Written Opinion; International Application No. PCT/US2014/034032; International Filing Date: Apr. 14, 2014, dated Sep. 8, 2014, pp. 1-8.
PCT Written Opinion; International Application No. PCT/US2014/072702; International Filing Date: Dec. 30, 2014, dated Mar. 16, 2015, pp. 1-10.
PCT Written Opinion; International Application No. PCT/US2014/072708; International Filing Date: Dec. 30, 2014, dated Mar. 3, 2015, pp. 1-6.
PCT Written Opinion; International Application No. PCT/US2015/018072; International Filing Date: Feb. 27, 2015, dated Jun. 17, 2015, pp. 1-8.
PCT Written Opinion; International Application No. PCT/US2015/031074; International Filing Date: May 15, 2015, dated Sep. 15, 2015, pp. 1-6.
PCT Written Opinion; International Application No. PCT/US2015/031742; International Filing Date: May 20, 2015, dated Dec. 16, 2015, pp. 1-8.
PCT Written Opnion; International Application No. PCT/US2012/047409; International Filing Date: Jul. 19, 2012, dated Feb. 27, 2013, pp. 1-10.

(56) References Cited

OTHER PUBLICATIONS

Restriction Requirement issued in U.S. Appl. No. 12/338,428 dated Jan. 5, 2011.
Restriction Requirement issued in U.S. Appl. No. 12/338,682 dated Apr. 18, 2011.
Restriction Requirement issued in U.S. Appl. No. 12/338,682 dated Jul. 14, 2011.
Richard W. Hartel, "Crystallization and Drying During Hard Panning," The Manufacturing Confectioner, pp. 51-57, Feb. 1995.
Robert Boutin, et al., "Sugarless Hard Panning," The Manufacturing Confectioner, pp. 35-42, Nov. 2004.
Robert D. Walter, "Panning—the specialist's specialty" Part 1;Candy & Snack Industry, pp. 43-51; Dec. 1974.
Robert D. Walter, "Panning—the Specialist's Specialty"; Part 2; Candy & Snack Industry; pp. 44-51; Jan. 1975.
Robert L. Davidson, "Handbook of Water-Soluble Gums and Resins," Handbook of Water-Soluble Gums and Resins, Jun. 5, 1980, Chapter 24, Xanthan Gum, pp. 1-33.
RU 1st Office Action with translation, RU Application No. 2014106418/13(010180); dated Jul. 3, 2015, pp. 1-5.
RU 1st Office Action with translation; Application No. 2013145559/13(070430); dated Jan. 20, 2015, pp. 1-11.
RU 1st Office Action with translation; RU Application No. 2014106421/13(010183); dated Jul. 6, 2015, pp. 1-10.
RU 1st Office Action with translation; RU Application No. 2014106422/13(010184); dated May 14, 2015, pp. 1-10.
CN Decision of Rejection with translation; CN Application No. 201280046229.8; dated Apr. 14, 2016, pp. 1-7.
CN Decision of Rejection with translation; CN Application No. 201280046231.5; dated Sep. 7, 2016, pp. 1-14.
CN Notice of Allowance with translation, CN Application No. 201280022799.3, dated Sep. 9, 2015, pp. 1-4.
CN Notice of Allowance with translation; CN Application No. 200980155688.8; dated May 4, 2017, pp. 1-4.
CN Notice of Allowance with translation; CN Application No. 200980155689.2; dated Dec. 12, 2013, pp. 1-4.
CN Notice of Allowance with translation; CN Application No. 200980155690.5; dated Apr. 30, 2014, pp. 1-4.
CN Notice of Allowance with translation; CN Application No. 201080065664.6; dated Jul. 8, 2015 , pp. 1-6.
CN Notice of Allowance with translation; CN Application No. 201180037795.8; dated Mar. 17, 2014, pp. 1-4.
CN Notice of Allowance with translation; CN Application No. 201180037796.2; dated Mar. 17, 2014, pp. 1-14.
CN Notice of Allowance with translation; CN Application No. 201380046385.9; dated Mar. 15, 2017, pp. 1-4.
CN Notification of the Reexamination with translation for CN Patent Application No. 201280046231.5 dated Jul. 28, 2017.
CN Notification of the Reexamination with translation, CN Application No. 201280046306.X; dated May 12, 2017, pp. 1-22.
CN Notification of the Reexamination with translation; CN Application No. 201280046229.8; dated Feb. 16, 2017, pp. 1-7.
CN Notificiation of the Reexamination with translation, CN Application No. 201280046306.X; dated Dec. 22, 2016, pp. 1-20.
CN Request for Reexamination with translation; CN Application No. 201280046231.5; dated Dec. 22, 2016, pp. 1-30.
CN Summary of the Decision of Reexamination with translation; CN Application No. 201280046229.8; dated Jun. 22, 2017, pp. 1-10.
Database FSTA, [online] International Food Information Service IFIS, Frankfurt-Main, DE, 1992, Ananymous, "How is Gum Made," XP002687037, Database Accession No. FS-1992-09-K-0010 Abstract.
E.B. Jackson, "Sugar Confectionery Manufacture," Blackie and Son Ltd. 1990, pp. 1-20.
EP Communication Extended European Search Report; Application No. 17185358.3-1375; dated Oct. 4, 2017, pp. 1-8.
EP Communication Pursuant to Aricle 94(3) EPC, Application No. 12 741 210.4-1358; dated May 12, 2017, pp. 1-8.
EP Communication Pursuant to Aricle 94(3) EPC, Application No. 12 741 210.4-1358; dated Sep. 15, 2016, pp. 1-8.
EP Communication Pursuant to Aricle 94(3) EPC; Application No. 12 741 209.6-1358; dated May 12, 2017, pp. 1-6.
EP Communication Pursuant to Aricle 94(3) EPC; Application No. 12 741 209.6-1358; dated Sep. 15, 2016, pp. 1-10.
EP Communication Pursuant to Aricle 94(3) EPC; Application No. 09 756 643.4-1358; dated Jul. 12, 2017, pp. 1-4.
EP Communication Pursuant to Article 94(3) EPC; Application No. 09 756 643.4-1358; dated Oct. 6, 2016, pp. 1-7.
EP Communication Pursuant to Article 94(3) EPC; Application No. 09 810 783.2-1358; dated Oct. 6, 2016, pp. 1-4.
EP Communication Pursuant to Article 94(3) EPC; Application No. 10 844 138.7-1375 dated Feb. 22, 2017, pp. 1-6.
EP Communication Pursuant to Article 94(3) EPC; Application No. 11 726 558.7-1358; dated May 18, 2015, pp. 1-5.
EP Communication Pursuant to Article 94(3) EPC; Application No. 11 781 895.5-1358; dated May 22, 2015, pp. 1-4.
EP Communication Pursuant to Article 94(3) EPC; Application No. 12 709 260.9-1358; dated Feb. 1, 2017, pp. 1-4.
EP Communication Pursuant to Article 94(3) EPC; Application No. 12 741 209.6-1358; dated Dec. 20, 2017, pp. 1-6.
EP Communication Pursuant to Article 94(3) EPC; Application No. 12 741 211.2-1358; dated Mar. 23, 2017; pp. 1-6.
EP Communication Pursuant to Article 94(3) EPC; Application No. 12 741 211.2-1358; dated Sep. 15, 2016, pp. 1-7.
EP Communication Pursuant to Article 94(3) EPC; Application No. 14 824 334.-1375; dated Aug. 17, 2017; pp. 1-14.
EP Communication Pursuant to Article 94(3) EPC; Application No. 14 824 335.5-1375; dated Nov. 13, 2017, pp. 1-7.
EP Communication Pursuant to Rules 161(1) and 162 EPC; Application No. 09756643.4-2114 PCT/US2009065594; dated Nov. 25, 2011, pp. 1-8.
EP Communication Pursuant to Rules 161(1) and 162 EPC; Application No. 09810783.2-2114 PCT/IB2009007718; dated Jul. 21, 2011, pp. 1-2.
EP Communication Pursuant to Rules 161(1) and 162 EPC; Application No. 11726558.7-2114; dated Jan. 9, 2013, pp. 1-2.
EP Communication Pursuant to Rules 161(1) and 162 EPC; Application No. 11781895.5-2114; dated Jan. 9, 2013, pp. 1-2.
EP Communication Pursuant to Rules 161(1) and 162 EPC; Application No. 12741209.6-1358; dated Feb. 28, 2014, pp. 1-2.
EP Communication Pursuant to Rules 161(1) and 162 EPC; Application No. 12741210.4-1358; dated Feb. 28, 2014, pp. 1-2.
EP Communication Pursuant to Rules 161(1) and 162 EPC; Application No. 12741211.2-1358; dated Feb. 28, 2014, pp. 1-2.
EP Communication Pursuant to Rules 161(1) and 162 EPC; Application No. 13771024.0-1357; dated Apr. 29, 2015, pp. 1-2.
EP Communication Pursuant to Rules 161(1) and 162 EPC; Application No. 14723283.9-1357; dated Nov. 24, 2015, pp. 1-2.
EP Communication Pursuant to Rules 161(1) and 162 EPC; Application No. 14824334.8-1375; dated Aug. 10, 2016, pp. 1-2.
EP Communication Pursuant to Rules 161(1) and 162 EPC; Application No. 14824335.5-1375; dated Aug. 10, 2016, pp. 1-2.
EP Communication Pursuant to Rules 161(1) and 162 EPC; Application No. 15709397.2-1358; dated Oct. 14, 2016, pp. 1-2.
EP Communication Pursuant to Rules 161(1) and 162 EPC; Application No. 15728967.9-1358; dated Jan. 20, 2017, pp. 1-2.
EP Communication Pursuant to Rules 161(1) and 162 EPC; Application No. 15729600.5-1375; dated Dec. 23, 2016, pp. 1-2.
EP Communication under Rule 71(3) EPC; Application No. 09 810 783.2-1358; dated Apr. 19, 2017, pp. 1-8.
RU 1st Office Action with Translation; RU Patent Application No. 2016130013/13(046711); dated Nov. 21, 2017; pp. 1-9.
RU 2nd Office Action with translation; Application No. 2012135675/13(057620); dated Feb. 6, 2014, pp. 1-4.
RU 2nd Office Action with translation; RU Application No. 2014106421/13(010183); dated Oct. 20, 2015, pp. 1-7.
RU 2nd Office Action with translation; RU Application No. 2014106422/13(010184); dated Aug. 11, 2015, pp. 1-11.
RU 3rd Office Action with translation; Application No. 2012135675/13(057620); dated Apr. 28, 2014, pp. 1-7.
RU Decision of Granting with translation, RU Application No. 2014106418/13(010180); dated Jan. 13, 2016, pp. 1-24.

(56) References Cited

OTHER PUBLICATIONS

RU Decision of Granting with Translation; Application No. 2012135675/13(057620) dated Aug. 22, 2014, pp. 1-16.
RU Decision of Granting with translation; Application No. 2013145559/13(070430); dated Mar. 26, 2015; pp. 1-15.
RU Decision of Granting with translation; RU Application No. 2014106421/13(010183); dated Jan. 26, 2016, pp. 1-19.
RU Decision of Granting with translation; RU Application No. 2014106422/13(010184); dated Nov. 26, 2015, pp. 1-22.
Supervising Editor Aya Kagawa, "Fourth Standard Tables of Food Composition in Japan," First Edition, Kagawa Education Institute of Nutrition, Published Department, (1994), pp. 72-73.
Supplementary European Search Report for App. No. 08 866 890 dated Jan. 22, 2014.
Supplementary European Search Report for App. No. 08868714 dated Jan. 15, 2014.
U.S. Office Action; U.S. Appl. No. 12/352,110; Advisory Action; dated Dec. 16, 2011, pp. 1-3.
U.S. Office Action; U.S. Appl. No. 12/352,110; Final Office Action; dated Oct. 25, 2011, pp. 1-30.
U.S. Office Action; U.S. Appl. No. 12/352,110; Non-Final Office Action; dated May 25, 2011, pp. 1-26.
U.S. Office Action; U.S. Appl. No. 12/352,110; Notice of Allowance; dated Mar. 22, 2012, pp. 1-8.
U.S. Office Action; U.S. Appl. No. 12/352,110; Restriction Requirement; dated Feb. 2, 2011, pp. 1-5.
U.S. Office Action; U.S. Appl. No. 12/624,440; Final Office Action; dated Aug. 20, 2015, pp. 1-38.
U.S. Office Action; U.S. Appl. No. 12/624,440; Final Office Action; dated Dec. 15, 2016, pp. 1-19.
U.S. Office Action; U.S. Appl. No. 12/624,440; Final Office Action; dated Mar. 14, 2013, pp. 1-28.
U.S. Office Action; U.S. Appl. No. 12/624,440; Interview Summary; dated Sep. 14, 2016, pp. 1-3.
U.S. Office Action; U.S. Appl. No. 12/624,440; Non-Final Office Action; dated Mar. 13, 2012, pp. 1-44.
U.S. Office Action; U.S. Appl. No. 12/624,440; Non-Final Office Action; dated Mar. 2, 2015, pp. 1-39.
U.S. Office Action; U.S. Appl. No. 12/624,440; Non-Final Office Action; dated May 16, 2016, pp. 1-20.
U.S. Office Action; U.S. Appl. No. 12/624,440; Notice of Allowance; dated Mar. 1, 2017, pp. 1-20.
U.S. Office Action; U.S. Appl. No. 12/624,440; Restriction Requirement; dated Feb. 17, 2012, pp. 1-8.
U.S. Office Action; U.S. Appl. No. 12/624,440; Supplemental Notice of Allowance; dated Jun. 2, 2017, pp. 1-8.
U.S. Office Action; U.S. Appl. No. 12/624,453; Final Office Action; dated Aug. 25, 2015, pp. 1-37.
U.S. Office Action; U.S. Appl. No. 12/624,453; Final Office Action; dated Dec. 16, 2016, pp. 1-17.
U.S. Office Action; U.S. Appl. No. 12/624,453; Final Office Action; dated Mar. 14, 2013, pp. 1-29.
U.S. Office Action; U.S. Appl. No. 12/624,453; Interview Summary; dated Aug. 24, 2016, pp. 1-3.
U.S. Office Action; U.S. Appl. No. 12/624,453; Non-Final Office Action; dated Feb. 13, 2015, pp. 1-35.
U.S. Office Action; U.S. Appl. No. 12/624,453; Non-Final Office Action; dated Mar. 13, 2012, pp. 1-47.
U.S. Office Action; U.S. Appl. No. 12/624,453; Non-Final Office Action; dated May 19, 2016, pp. 1-26.
U.S. Office Action; U.S. Appl. No. 12/624,453; Notice of Allowance; dated Mar. 6, 2017, pp. 1-19.
U.S. Office Action; U.S. Appl. No. 12/624,453; Supplemental Notice of Allowance; dated Jun. 2, 2017, pp. 1-8.
U.S. Office Action; U.S. Appl. No. 12/624,436; Advisory Action; dated Apr. 11, 2013, pp. 1-7.
U.S. Office Action; U.S. Appl. No. 12/624,436; Final Office Action; dated Aug. 21, 2015, pp. 1-43.
U.S. Office Action; U.S. Appl. No. 12/624,436; Final Office Action; dated Dec. 14, 2016, pp. 1-20.
U.S. Office Action; U.S. Appl. No. 12/624,436; Final Office Action; dated Feb. 14, 2013, pp. 1-31.
U.S. Office Action; U.S. Appl. No. 12/624,436; Interview Summary; dated Aug. 10, 2016, pp. 1-3.
U.S. Office Action; U.S. Appl. No. 12/624,436; Interview Summary; dated May 13, 2013, pp. 1-3.
U.S. Office Action; U.S. Appl. No. 12/624,436; Non-Final Office Action; dated Feb. 12, 2015, pp. 1-39.
U.S. Office Action; U.S. Appl. No. 12/624,436; Non-Final Office Action; dated Jun. 2, 2016, pp. 1-30.
U.S. Office Action; U.S. Appl. No. 12/624,436; Non-Final Office Action; dated Mar. 15, 2012, pp. 1-49.
U.S. Office Action; U.S. Appl. No. 12/624,436; Notice of Allowance; dated Mar. 8, 2017, pp. 1-12.
U.S. Office Action; U.S. Appl. No. 12/624,436; Supplemental Notice of Allowance; dated Mar. 29, 2017, pp. 1-2.
U.S. Office Action; U.S. Appl. No. 12/624,436; Supplemental Notice of Allowance; dated May 26, 2017, pp. 1-8.
U.S. Office Action; U.S. Appl. No. 13/483,638; Advisory Action; dated Jul. 18, 2014, pp. 1-3.
"Bar Manufacturing," Nov. 17, 2007 (Nov. 17, 2007), XP002678488, Retrieved from the Internet: URL: http://web.archive.org/web/20061117002445/http://www.sollich.com/webEnglisch/produkte/riegelherstellung/conbarsuesswaren.php?navid=7 [retrieved on Jun. 25, 2012].
Anonymous: "Sugar Free Gum Product", GNPD, May 1, 2011, XP055397367, pp. 1-3; Retrieved from the Internet: URL: www.gnpd.com/sinatra/recordpage/1550406 [retrieved on Aug. 9, 2017].
Anonymous: "Wild Strawberry & Tangy Citrus Sugar-Free Gum," GNPD, Feb. 1, 2010 (Feb. 1, 2010), XP055397371, pp. 1-3; Retrieved from the Internet: URL: www.gnpd.com/sinatra/recordpage/1263179; [retrieved on Aug. 9, 2017].
AU 1st Office Action, AU Application No. 2009319826; dated Jul. 2, 2012, pp. 1-4.
AU 1st Office Action, AU Application No. 2009319827; dated Jul. 25, 2012, pp. 1-4.
AU 1st Office Action, AU Application No. 2009321276; dated Jun. 21, 2012, pp. 1-4.
AU 1st Office Action, AU Application No. 2013206311; dated Apr. 24, 2014, pp. 1-6.
AU 1st Office Action, AU Application No. 2015203194; dated Jan. 22, 2016, pp. 1-5.
AU 1st Office Action, AU Application No. 2012229325; dated Jul. 11, 2014, pp. 1-3.
AU 2nd Office Action, AU Application No. 2009319826; dated Oct. 10, 2012, pp. 1-4.
AU 2nd Office Action, AU Application No. 2009321276; dated Oct. 11, 2012, pp. 1-3.
AU 2nd Office Action, AU Application No. 2013206311; dated Nov. 26, 2014, pp. 1-5.
AU Notice of Acceptance; AU Application No. 2010343332; dated May 8, 2014, pp. 1-2.
AU Notice of Allowance, AU Application No. 2009319826; dated Apr. 2, 2013, pp. 1-1.
AU Notice of Allowance, AU Application No. 2009319827; dated Nov. 9, 2012, pp. 1-3.
AU Notice of Allowance, AU Application No. 2009321276; dated Feb. 28, 2013, pp. 1-3.
AU Notice of Allowance, AU Application No. 2013206311; dated Feb. 19, 2015, pp. 1-2.
AU Patent Examination Report No. 1, Application No. 2010343332; dated Jun. 3, 2013, pp. 1-3.
Australian Notice of Acceptance, AU Application No. 2012229325, dated Jun. 25, 2015, pp. 1-2.
Canadian Intellectual Property Office, Office Action; CA Application No. 2787148; dated Aug. 14, 2013, pp. 1-3.
Canadian Intellectual Property Office, Office Action; CA Application No. 2787148; dated May 20, 2014, pp. 1-4.
Canadian Intellectual Property Office, Office Action; CA Application No. 2829351, dated Jan. 16, 2015, pp. 1-5.
Cerestra, "Polyols in Food," Denbigh Lloyd, Aug. 2001, pp. 1-12.
CN 1st Office Action with Translation, Application No. 201080065664.6, dated Aug. 9, 2013, pp. 1-12.

(56) References Cited

OTHER PUBLICATIONS

CN 1st Office Action with translation, CN Application No. 201280022799.3; dated Jul. 7, 2014, pp. 1-18.
CN 1st Office Action with translation, CN Application No. 201280046306.X; dated Feb. 2, 2015, pp. 1-39.
CN 1st Office Action with translation; CN Application No. 200980155688.8; dated Nov. 5, 2012, pp. 1-28.
CN 1st Office Action with translation; CN Application No. 200980155689.2; dated Nov. 19, 2012, pp. 1-26.
CN 1st Office Action with translation; CN Application No. 200980155690.5; dated Oct. 29, 2012, pp. 1-14.
CN 1st Office Action with translation; CN Application No. 201180037795.8; dated Aug. 26, 2013, pp. 1-16.
CN 1st Office Action with translation; CN Application No. 201180037796.2; dated Aug. 26, 2013, pp. 1-12.
CN 1st Office Action with translation; CN Application No. 201280046229.8; dated Jan. 19, 2015, pp. 1-13.
CN 1st Office Action with translation; CN Application No. 201280046231.5; dated Jan. 14, 2015, pp. 1-18.
CN 1st Office Action with translation; CN Application No. 201380046385.9; dated Jan. 15, 2016, pp. 1-19.
CN 2nd Office Action with Translation, Application No. 201080065664.6, dated Jun. 24, 2014, pp. 1-7.
CN 2nd Office Action with translation, CN Application No. 201280022799.3, dated Mar. 12, 2015, pp. 1-6.
CN 2nd Office Action with translation, CN Application No. 201280046306.X; dated Nov. 2, 2015, pp. 1-31.
CN 2nd Office Action with translation; CN Application No. 200980155688.8; dated Sep. 12, 2013, pp. 1-21.
CN 2nd Office Action with translation; CN Application No. 200980155689.2; dated Jul. 10, 2013, pp. 1-17.
CN 2nd Office Action with translation; CN Application No. 200980155690.5; dated Jun. 24, 2013, pp. 1-31.
CN 2nd Office Action with translation; CN Application No. 201280046229.8; dated Sep. 24, 2015, pp. 1-9.
CN 2nd Office Action with translation; CN Application No. 201280046231.5; dated Oct. 10, 2015, pp. 1-16.
CN 2nd Office Action with translation; CN Application No. 201380046385.9; dated Sep. 6, 2016, pp. 1-6.
CN 3rd Office Action with Translation, Application No. 201080065664.6, dated Dec. 31, 2014, pp. 1-9.
CN 3rd Office Action with translation; CN Application No. 200980155688.8; dated Apr. 19, 2016, pp. 1-24.
CN 3rd Office Action with translation; CN Application No. 200980155690.5; dated Nov. 14, 2013, pp. 1-17.
CN 3rd Office Action with translation; CN Application No. 201280046231.5; dated Mar. 9, 2016, pp. 1-6.
CN 4th Office Action with translation; CN Application No. 200980155688.8; dated Oct. 28, 2016, pp. 1-12.
CN Decision of Rejection with translation, CN Application No. 201280046306.X; dated May 4, 2016, pp. 1-20.
CN Decision of Rejection with translation; CN Application No. 200980155688.8; dated Feb. 7, 2014, pp. 1-20.
Bharat Jani, "Advanced Gum Forming," U.S. Appl. No. 61/510,119, filed Jul. 21, 2011.
Bharat Jani, "System and Method of Forming and Sizing Chewing Gum and/or Altering Temperature of Chewing Gum," U.S. Appl. No. 61/247,997, filed Oct. 2, 2009.
Bharat Jani, "System and Method of Forming Multilayer Confectionery," U.S. Appl. No. 61/451,805, filed Mar. 11, 2011.
Glenn Visscher, "Parallel Gum Component Mixing Systems and Methods," U.S. Appl. No. 61/045,764, filed Apr. 17, 2008.
James Duggan, "Gum Structure Miding Systems and Methods," U.S. Appl. No. 61/016,016, filed Dec. 21, 2007.
James Duggan, "Gum Structure Mixing Systems and Methods," U.S. Appl. No. 61/036,626, filed Mar. 14, 2008.
Petros Gebreselassie, "Effervescent Pressed Gum Tablet Compositions," U.S. Appl. No. 60/618,222, filed Oct. 13, 2004.
Roman Oberli, "System and Methods for Passive Ticketing," U.S. Appl. No. 62/247,997, filed Oct. 29, 2015.
U.S. Office Action; U.S. Appl. No. 13/483,638; Final Office Action; dated Apr. 23, 2014, pp. 1-13.
U.S. Office Action; U.S. Appl. No. 13/483,638; Non-Final Office Action; dated Sep. 12, 2013, pp. 1-15.
U.S. Office Action; U.S. Appl. No. 13/483,638; Notice of Allowance; dated Jan. 16, 2015, pp. 1-9.
U.S. Office Action; U.S. Appl. No. 13/522,767 ; Non-Final Office Action; dated Nov. 10, 2014, pp. 1-83.
U.S. Office Action; U.S. Appl. No. 13/522,767; Advisory Action; dated Aug. 11, 2015, pp. 1-3.
U.S. Office Action; U.S. Appl. No. 13/522,767; Final Office Action; dated Jun. 3, 2015, pp. 1-31.
U.S. Office Action; U.S. Appl. No. 13/522,767; Final Office Action; dated Jun. 30, 2017, pp. 1-24.
U.S. Office Action; U.S. Appl. No. 13/522,767; Non-Final Office Action; dated Dec. 13, 2016, pp. 1-24.
U.S. Office Action; U.S. Appl. No. 13/522,767; Non-Final Office Action; dated Jun. 3, 2016, pp. 1-20.
U.S. Office Action; U.S. Appl. No. 13/701,104; Advisory Action; dated Mar. 1, 2016, pp. 1-8.
U.S. Office Action; U.S. Appl. No. 13/701,104; Final Office Action; dated Nov. 4, 2015, pp. 1-24.
U.S. Office Action; U.S. Appl. No. 13/701,104; Non-Final Office Action; dated Apr. 9, 2015, pp. 1-111.
U.S. Office Action; U.S. Appl. No. 13/701,196; Final Office Action; dated Jun. 24, 2015, pp. 1-34.
U.S. Office Action; U.S. Appl. No. 13/701,196; Non-Final Office Action; dated Dec. 17, 2014, pp. 1-22.
U.S. Office Action; U.S. Appl. No. 13/701,196; Non-Final Office Action; dated Jul. 7, 2014, pp. 1-40.
U.S. Office Action; U.S. Appl. No. 13/701,196; Restriction Requirement; dated Feb. 13, 2014, pp. 1-7.
U.S. Office Action; U.S. Appl. No. 14/004,343; Advisory Action; dated Apr. 20, 2017; pp. 1-5.
U.S. Office Action; U.S. Appl. No. 14/004,343; Advisory Action; dated Dec. 14, 2015; pp. 1-8.
U.S. Office Action; U.S. Appl. No. 14/004,343; Final Office Action; dated Dec. 30, 2016; pp. 1-13.
U.S. Office Action; U.S. Appl. No. 14/004,343; Final Office Action; dated Sep. 17, 2015; pp. 1-43.
U.S. Office Action; U.S. Appl. No. 14/004,343; Non-Final Office Action; dated Feb. 26, 2015; pp. 1-44.
U.S. Office Action; U.S. Appl. No. 14/004,343; Non-Final Office Action; dated Jul. 3, 2014, pp. 1-42.
U.S. Office Action; U.S. Appl. No. 14/004,343; Non-Final Office Action; dated May 23, 2016; pp. 1-13.
U.S. Office Action; U.S. Appl. No. 14/004,343; Notice of Allowance; dated Jun. 7, 2017; pp. 1-8.
U.S. Office Action; U.S. Appl. No. 14/004,343; Restriction Requirement; dated Jan. 15, 2014, pp. 1-8.
U.S. Office Action; U.S. Appl. No. 14/233,796; Final Office Action; dated Feb. 5, 2018, pp. 1-23.
U.S. Office Action; U.S. Appl. No. 14/233,698; Non-Final Office Action; dated May 4, 2017; pp. 1-87.
U.S. Office Action; U.S. Appl. No. 14/233,698; Restriction Requirement; dated Feb. 17, 2017; pp. 1-8.
U.S. Office Action; U.S. Appl. No. 14/233,796; Non-Final Office Action; dated Jul. 24, 2017; pp. 1-102.
U.S. Office Action; U.S. Appl. No. 14/233,796; Restriction Requirement; dated Mar. 3, 2017, pp. 1-9.
U.S. Office Action; U.S. Appl. No. 14/233,829; Non-Final Office Action; dated Apr. 13, 2017; pp. 1-89.
U.S. Office Action; U.S. Appl. No. 14/233,829; Restriction Requirement; dated Jan. 26, 2017; pp. 1-7.
U.S. Office Action; U.S. Appl. No. 14/430,083; Restriction Requirement; dated Jul. 5, 2017; pp. 1-7.
William Raleigh, "HSH as a Bulking Agent in Confections," The Manufacturing Confectioner, Nov. 1995, pp. 57-59.
Written Opinion of the International Searching Authority; International Application No. PCT/US2008/087618 dated Apr. 8, 2009.
Written Opinion of the International Searching Authority; International Application No. PCT/US2008/087625 dated Apr. 7, 2009.

(56) References Cited

OTHER PUBLICATIONS

Written Opinion of the International Searching Authority; International Application No. PCT/US2010/051085; International Filing Date: Oct. 1, 2010, dated Jun. 29, 2011, pp. 1-6.
Written Opinion of the International Searching Authority; International Application No. PCT/US2014/052614; International Filing Date: Aug. 26, 2014; dated Nov. 20, 2014; 8 Pages.
Decision of Final Rejection (with Translation); Japanese Application No. 2016-550532; dated Dec. 20, 2018; 10 Pages.
English Translation of JP H06-46760. (Year: 1994), pp. 1-13.
Examination Report under Sections 12 & 13 of the Patents Act, 1970 and the Patent Rules, 2003; Indian Application No. 313/CHENP/2014; dated Dec. 14, 2018; 7 Pages.
U.S. Office Action; U.S. Appl. No. 15/108,624; filed Jun. 28, 2016; Non-Final Office Action; dated Jan. 28, 2019, pp. 1-137.
Final Office Action; U.S. Appl. No. 13/522,767, filed Nov. 16, 2012, System and Method of Forming and Sizing Chewing Gum and/or Altering Temerature of Chewing Gum; Notification Date: Nov. 29, 2018; 98 Pages.
"What is Ultrasonic Spray Nozzle?", [Online], Jul. 16, 2013, [Apr. 18, 2018 Search], https://web.archive.org/web/20130716222437/http://www.ticjapan.com/japanese/products/atmizer.html>, 4 pages.
EP Examination Report; EP Application No. 15728967.9-1106; dated Apr. 30, 2018; 4 pages.
JP 2nd Office Action, Japanese Patent Application No. 2016-550532; dated Apr. 27, 2018, 12 pages.
MX 2nd Office Action, Mexican Patent Application No. MX/a/2014/000795; dated Apr. 11, 2018, 8 pages.
Non-Final Office Action; U.S. Appl. No, 14/233,796, filed Jun. 6, 2014; Advanced Gum Forming; Notification Date: Nov. 2, 2018; 105 Pages.
Notification of the First Office Action and Search Report; Chinese Application No. 2015/0026070.7; dated Mar. 12, 2018; 17 Pages.
Office Action and Search Report; Chinese Application No. 201480046262.X; dated Nov. 2, 2018; 10 Pages.
U.S. Office Action; U.S. Appl. No. 14/004,343; Non-Final Office Aciton; dated Sep. 6, 2018, pp. 1-16.
U.S. Office Action; U.S. Appl. No. 15/108,916; Non-Final Office Action; dated Sep. 19, 2018, pp. 1-17.

\* cited by examiner

METHOD FOR MANUFACTURING A COMESTIBLE

CROSS REFERENCE TO RELATED APPLICATIONS

This application is a National Stage application of PCT/US2015/018072, filed Feb. 27, 2015, which claims the benefit of U.S. Provisional Application No. 61/947,224, filed Mar. 3, 2014, both of which are incorporated by reference in their entirety herein.

FIELD OF THE INVENTION

The present invention relates to comestible manufacturing methods and systems and more particularly, to a method and system for applying a releasing agent within a comestible manufacturing system.

BACKGROUND OF THE INVENTION

Typically, the process of making and packaging comestibles, such as a confection or chewing gum, is time-consuming and involves a significant amount of machinery. For example, the process of making and packing gum products can include mixing and producing a finished gum as a non-uniform output, extruding and forming the finished gum into loaves, conditioning the loaves of the finished gum, extruding the loaves into a continuous thin sheet of the finished gum, rolling the continuous sheet through a series of rollers to a uniform reduced thickness, scoring and dividing sheets into individual scored sheets, conditioning the individual sheets in a conditioning room, dividing sheets into gum pieces, and packaging the gum pieces. Such processes of making and packaging gum products are disclosed in U.S. Pat. No. 6,254,373 assigned to the predecessor of interest of the present assignee, and U.S. patent application Ser. No. 12/352,110 assigned to the present assignee; the teachings and disclosures of which are hereby incorporated by reference in their entireties to the extent not inconsistent with the present disclosure.

During the process of making and packaging comestibles, the comestible may stick to one or more of the system components, such as the forming rollers or the cutting instruments for example. This sticking can result in an undesirable adhering of the comestible to the manufacturing components and harm the manufacturing. Such sticking may even require that the manufacturing system be stopped temporarily to lubricate the components or recalibrate the system. Powder dusting materials are commonly used as an anti-sticking agent during the formation of a comestible. However, powder dusting materials can accumulate over time, resulting in a buildup on either the product or the components of the manufacturing system. In addition, application of a powder dusting material requires significant clean up time when a line is changed over and often requires an expensive removal system.

The present invention is directed toward improvements and advancements over such prior systems and methods of making and packaging gum products.

BRIEF SUMMARY OF THE INVENTION

Disclosed is a method of manufacturing a comestible, the method including providing at least one manufacturing instrument configured to contact the comestible. A releasing agent is atomized and expelled from an expelling device. Application of pressure to the releasing agent is unnecessary to achieve the atomizing. The atomized releasing agent is applied to either a surface of the at least one manufacturing instrument configured to contact the comestible or to a surface of the comestible.

Disclosed is another method of manufacturing a comestible, the method including providing at least one forming instrument configured to contact the comestible. An expelling device configured to expel an atomizing spray of a releasing agent at a velocity less than 35 ft/s is provided. The releasing agent is applied to a surface of either the at least one manufacturing instrument configured to contact the comestible or to a surface of the comestible.

Disclosed is another method of manufacturing a comestible, the method including providing at least one forming instrument configured to contact the comestible. An expelling device configured to expel a releasing agent is provided. The releasing agent includes a plurality of uniformly distributed droplets. The releasing agent is applied to a surface of either the at least one manufacturing instrument configured to contact the comestible, or to a surface of the comestible.

BRIEF DESCRIPTION OF THE DRAWINGS

The accompanying drawings incorporated in and forming a part of the specification embodies several aspects of the present invention and, together with the description, serve to explain the principles of the invention. In the drawings.

DETAILED DESCRIPTION OF THE INVENTION

The following disclosure will detail particular embodiments according to the present disclosure, which provide improvements for preventing a comestible material from sticking to one or more forming components (e.g. sizing components, cutting components, scoring components, etc.) during the manufacturing thereof. In one embodiment, a system includes a set or pair of rollers for forming a comestible structure/mass into a continuous web or sheet having a desired thickness and a width, while imparting temperature control to the comestible at the same time. Rollers such as but not limited those described in U.S. application Ser. No. 13/522,767, which is herein incorporated by reference in its entirety, are contemplated herein. Moving walls such as the moving walls described in U.S. Application No. 61/510,119, which is herein incorporated by reference in its entirety, are also contemplated.

The comestible included in the comestible mass and sheet discussed herein include any type of edible product, such as but not limited to chewing gum (at any stage including elastomer, partially finished base, finished chewing gum base, and finished chewing gum), confection (which may be synonymous with chewing gum and candy), sweet and savory biscuits and cakes, nuts, and grains. For ease of description, the comestible will be referred as chewing gum for the remainder of the description. Certain compositions of chewing gum may have a non-uniform texture and/or a multi-layered composition.

Further, the system can eliminate the need for powder dusting material. By eliminating the use of dusting powders, a clean up process of the comestible manufacturing line can be dramatically made easy, since a substantially large portion of residual mess requiring lengthy cleaning in conventional rolling and scoring lines is due to the use of powders and the large number of rollers. In addition, dusting powder can accumulate on the components of the system and/or the comestible, which may have an undesirable effect on the taste or quality of the comestible.

Figure 1:
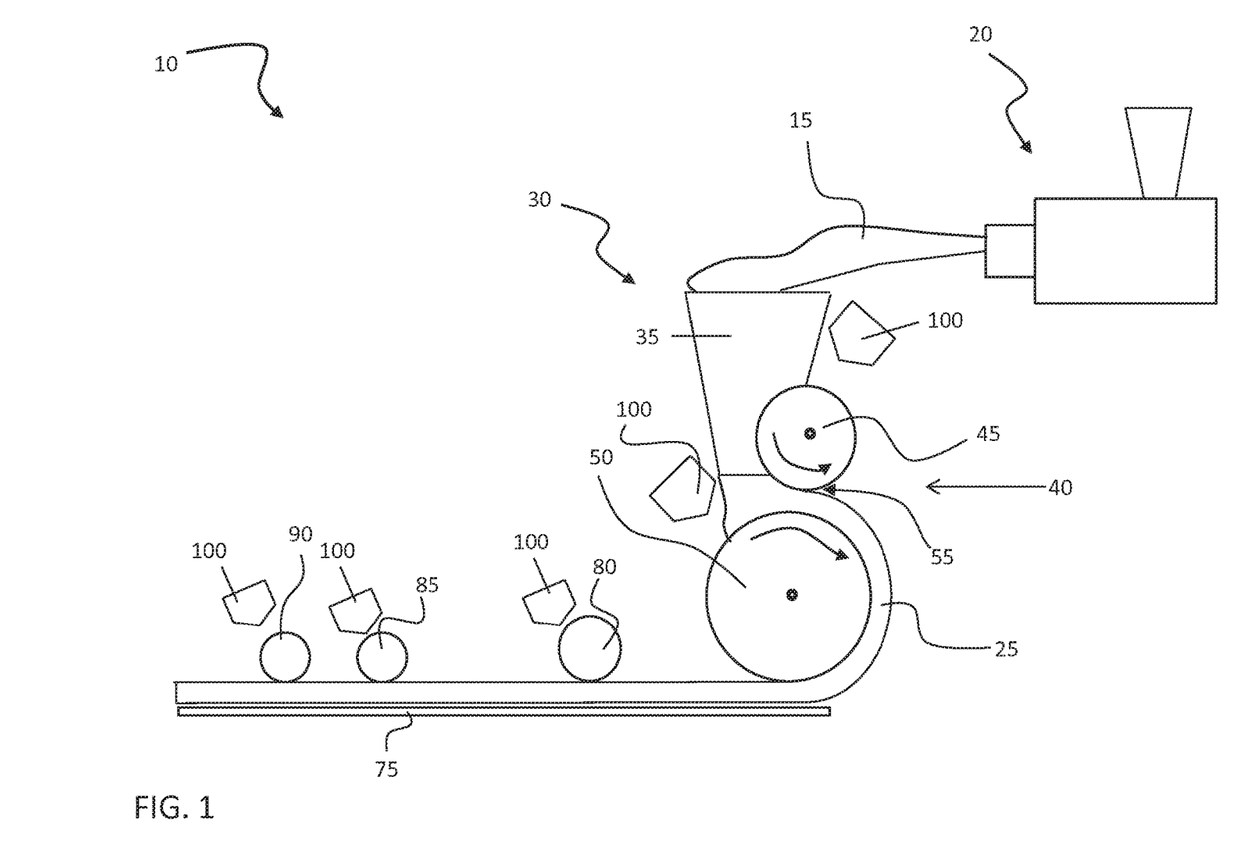
FIG. 1 is a schematic diagram of a comestible manufacturing system including at least one expelling device according to an embodiment of the invention.
Figure 2:
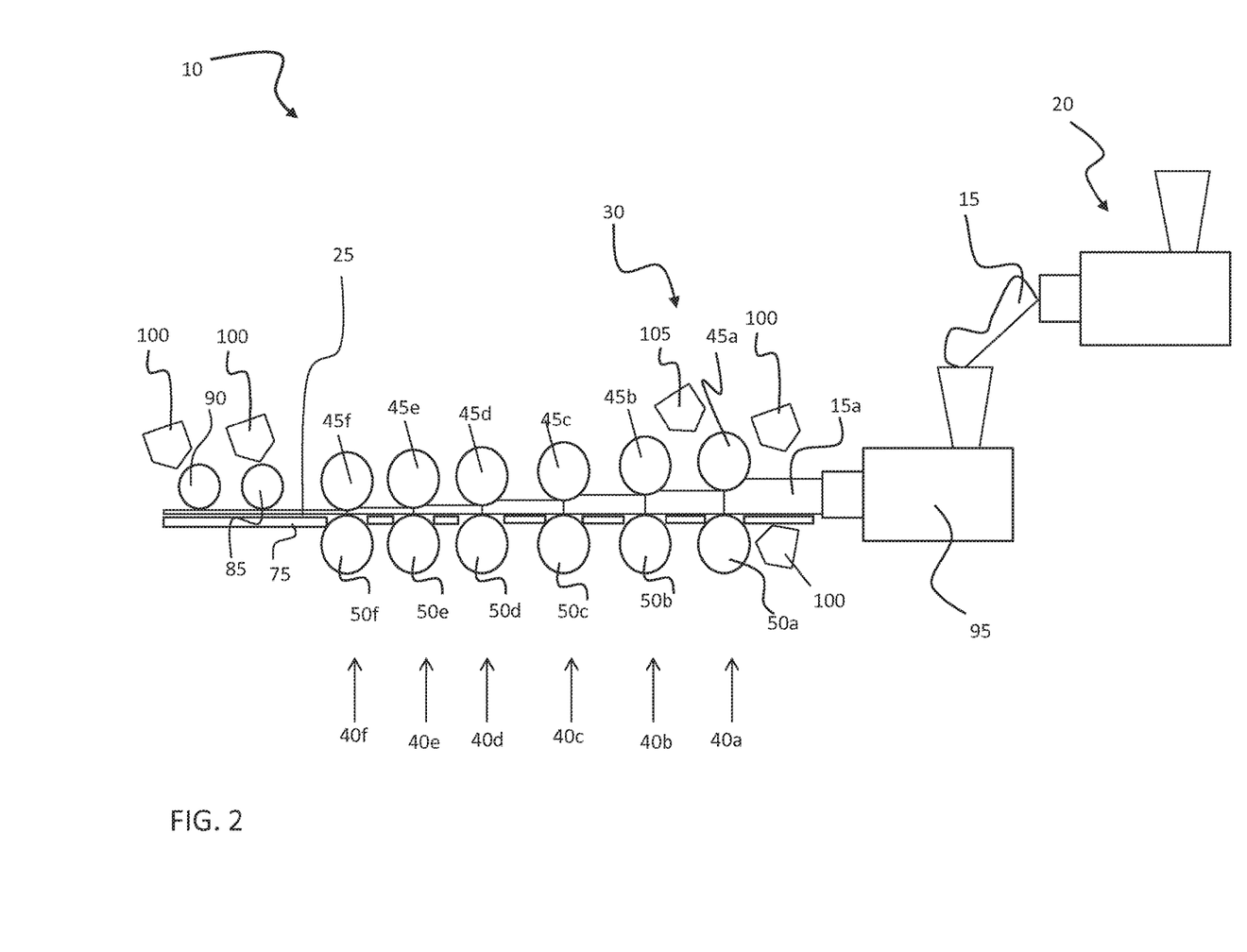
FIG. 2 is a schematic diagram of another a comestible manufacturing system including at least one expelling device according to an embodiment of the invention.

Referring now to FIGS. 1 and 2, exemplary systems for forming a chewing gum are illustrated. The comestible manufacturing systems 10 generally include a comestible mixing station 20 and a comestible forming or sizing station 30 that includes at least one pair of rollers 40. The system 10 may additionally include a further smoothing roller 80 located downstream from the comestible sizing station 30. The manufacturing systems 10 may also include a scoring roller 85 and cutting roller 90, as illustrated in the FIGS.

In the manufacturing system 10 illustrated in FIG. 1, the comestible forming station 30 includes a hopper 35 arranged at an upstream or entry point thereof. The forming station 30 additionally includes a pair of rollers 40, which in this embodiment include an upper roller 45 and a lower roller 50. The rollers 45, 50 are externally driven, for example by an operably coupled motor (not shown). In an exemplary embodiment, each of the rollers 45, 50 is provided with a motor, such that the rotational speed of each of the rollers 45, 50 can be controlled independently.

The hopper 35 is disposed proximate the rollers 40, and may be used for upstream surge control, capacity and feed control. The hopper 35 constrains, accumulates, and feeds the comestible mass 15 supplied from the mixing station 20, into an inlet or gap region 55 generally between the pair of rollers 40.

The comestible mass 15 moves through the hopper 35, such as via gravity or with the assistance of guide rollers (not shown) disposed within the hopper 35. In the exemplary embodiment of FIG. 1, as the comestible mass 15 exits the hopper output it is guided by the lower roller 50 toward the upper roller 45 and the gap 55 between the upper and lower rollers 45, 50. The counter rotating upper roller 45 and lower roller 50 pull the comestible mass 15 through the gap 55 between the pair of rollers 40 (also referred to as "forming rollers" or "sizing rollers" herein) to form and size the comestible mass 15 into the comestible sheet 25.

Upon exiting the gap 55 of the pair of rollers 40, the conveyor 75 moves the comestible sheet 25 having a final or substantially final thickness (of between about 0.3 mm to 10 mm for some sheet or slab forming systems) towards the smoothing roller 80, which is used to remove surface imperfections, kinks, and may further reduce the thickness of the comestible sheet 25.

In the exemplary embodiment of FIG. 1, the system 10 further includes a scoring roller 85 and a lateral dividing or cutting roller 90 downstream of the comestible forming station 30. The scoring roller 85 and the lateral dividing roller 90 score and divide the comestible sheet 25 into individual scored sheets. The scored sheets may then be conveyed to a cooling tunnel (not shown) for further conditioning. Thereafter, the comestible may be transported to further processing and packaging equipment for producing packaged comestible products, perhaps in a single line with the system 10.

The smoothing roller 80, scoring roller 85, and dividing roller 90, as well as their equivalents, are considered to be forming or manufacturing instruments within the forming system 10. In some embodiments, in addition to or in place of the scoring roller 85 and the dividing roller 90, the system 10 may include other comestible shaping solutions, such as a drop-roller, a die cutter, pelletizer or other similar comestible shaping equipment (provided the sheet is cooled to a sufficient extent). As such, the comestible manufacturing system 10 can produce a comestible having various final shapes which can subsequently be packaged, or pellets that are subsequently coated.

In another embodiment of the manufacturing system 10, illustrated in FIG. 2, the comestible forming station 30 includes a sizing type extruder 95 and a plurality of sizing rollers 40. The sizing type extruder 95 is a low shear extruder configured to force the comestible mass 15 supplied from the mixing station 20 through a forming die (not shown) having a defined width orifice, thereby forming a generally uniform extrusion 15a that may be a continuous stream of a substantially uniform size, or alternatively, may be periodically cut into separate shaped pieces of comestible mass 15. In the illustrated, non-limiting embodiment, the plurality of sizing rollers 40 are generally arranged in pairs, such as six pairs 40a-40f for example, and each pair 40 including an upper roller 45 and a lower roller 50 as illustrated in the FIG. In such embodiments, the upper and lower roller 45, 50 of each pair 40 includes rotational axes that are vertically offset to facilitate the creation of a gap (not shown) there between. The plurality of pairs of sizing rollers 40 are arranged generally in sequence over gaps or openings in a conveyor 75, such that the shaped comestible mass 15a formed by the sizing type extruder 95 passes through each of the plurality of sizing rollers 40 consecutively. The distance or gap between each consecutive pair of rollers 40 may be substantially identical, or alternatively may generally decrease so as to progressively reduce the thickness of the shaped comestible mass 15a.

Each pair of rollers 40 is configured to compress or deform and elongate the shaped comestible mass 15a as it passes between the upper and lower rollers 45, 50 to provide a generally uniform thickness. The comestible sheet 25 having a generally uniform thickness 65 may subsequently expand or shrink in its thickness depending on a formulation of the comestible. Further, after passing through the series of rollers 40, the comestible sheet 25 having a generally uniform thickness may subsequently be shaped, textured, and/or printed, which may alter the generally uniform thickness.

The rollers 40 of either embodiment of the comestible forming station 30 may be configured to have a smooth surface finish. In addition, the rollers 40 may also be configured with any desirable actuation device (not shown), such as but not limited to a servomechanism that controls the vertical position of the rollers 45, 50 within each roller pair 40 relative to each other and thereby adjusts the gap 55 there between.

With reference to both FIGS. 1 and 2, an expelling device 100 is configured to form a continuous or discontinuous film, layer, or coating of a releasing agent over a surface of one or more components that contact the comestible during the manufacturing process, or over a surface of the comestible itself. Exemplary releasing agents include, but are not limited to, food quality vegetable or mineral oil, medium chain triglycerides, and any other edible oils or lubricants for example. The releasing agent may be applied to prevent the comestible mass 15 or sheet 25 from sticking to a manufacturing instrument or component, such as the sizing rollers 45, 50 for example. Alternatively, the releasing agent may be applied for reasons other than preventing adherence to a manufacturing instrument, such as to modify the texture of the comestible, or to assist with packaging concerns for example. In one embodiment, the applied releasing agent has a desired flavor such that when the releasing agent contacts the comestible, the flavor of the releasing agent is transferred to the comestible.

In the illustrated, non-limiting embodiments of FIGS. 1 and 2, at least one expelling device 100 is positioned within the manufacturing system 10 so at to lubricate a lower roller, such as roller 50, of a pair of sizing rollers 40 of the comestible forming system 30. Alternatively, or in addition, another expelling device 100 may be configured to apply a coating of releasing agent to a surface of the upper roller, such as roller 45, of a pair of sizing rollers 40. The plurality of expelling devices 100 within the system 10 may be independent or may be fluidly coupled to one another.

In the exemplary embodiment of FIG. 2, an expelling device 100 is also arranged adjacent the output of the sizing type extruder 95 and is configured to apply the releasing agent to one or more surfaces of the comestible mass 15a. Although the expelling devices 100 are described as generally lubricating one or more of the sizing rollers 45, 50 of the forming system 30 or the comestible mass 15a before it enters one or more of the sizing rollers 45, 50, an expelling device 100 may be arranged at any location within the system 10 and may be configured to apply a releasing agent to any of the components in the system 10 that are configured to contact the comestible. Exemplary components include, but are not limited to a smoothing roller 80, a scoring roller 85, a dividing roller 90, a rotating chain die member, and one or more guillotine blades of a cut and wrap system for example.

By positioning the expelling device generally vertically above a horizontal mid-point of a surface to be lubricated, such as at or above the horizontal diameter of the roller 50 for example, gravity can compound with the velocity of the spray to assist in the delivery of the releasing agent to a desired surface. Because of the low velocity at which the releasing agent is expelled, the substantial entirety of the releasing agent tends to settle on the desired surface and form a film or coating. This provides a significant benefit over conventional pressure nozzles, where a liquid is expelled with such a high velocity (greater than 35 ft/s) that a significant portion of the liquid bounces off of the surface to be coated.

Figure 3:
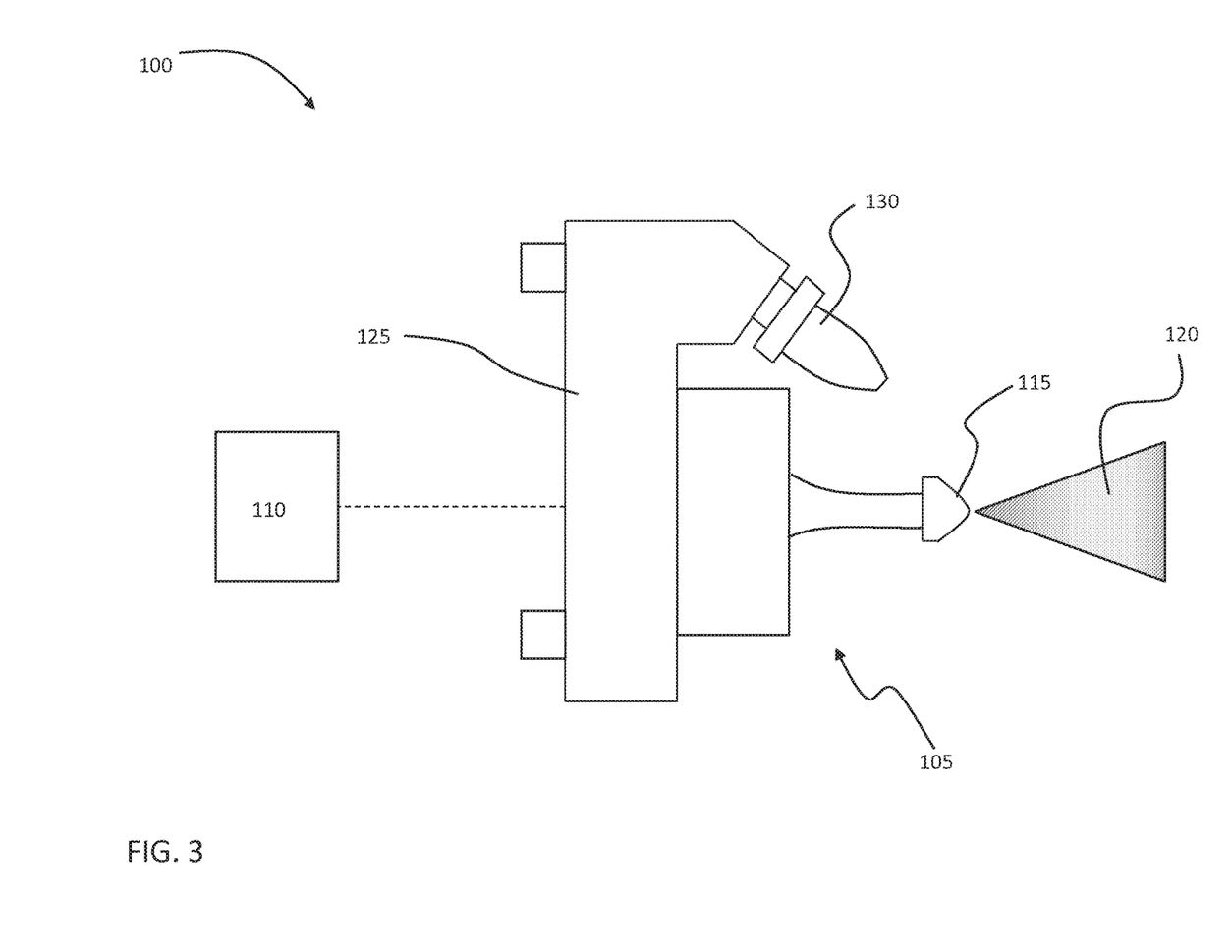
FIG. 3 is a side view of an expelling device according to an embodiment of the invention.

Referring now to FIG. 3, the expelling device 100 configured for use with the comestible manufacturing system 10 is illustrated in more detail. In the illustrated non-limiting embodiment, the expelling device 100 includes an ultrasonic atomizing spray nozzle 105 fluidly coupled to a liquid delivery system (illustrated schematically at 110). In an exemplary embodiment, the ultrasonic nozzle 105 uses high frequency sound vibration to atomize the liquid from the delivery system 110 (i.e. releasing agent) as it flows through the nozzle 105 into a fine mist spray 120 having a plurality of droplets. Because the ultrasonic spray nozzle 105 generally does not rely on pressure, the velocity with which the spray 120 is expelled from the atomizing surface 115 of the nozzle 105 is substantially lower than that of a pressurized nozzle. The velocity of the spray 120 is generally less than 35 ft/s, and more particularly, may be in the range of about 0.5 to about 5 ft/s and preferably between about 0.7 ft/s and about 1.2 ft/s. In addition, the rate at which the liquid is atomized by the nozzle 105 is primarily controlled by the rate at which liquid from the liquid delivery system 110 is supplied to the nozzle 105. In one embodiment, the flow rate of atomized liquid from the nozzle 105 is substantially constant and between about 5 mL/min and about 100 mL/min.

The droplets of atomized liquid that make up the spray 120 produced by the ultrasonic nozzle 105 have a relatively narrow and easily controllable distribution. The size of the droplets is dependent on the frequency at which the atomizing surface 115 of the nozzle 105 vibrates, as well as the surface tension and the density of the liquid being atomized. In the illustrated, non-limiting embodiment, one or more air jets 130 connected to the housing 125 of the nozzle 105 are positioned adjacent the atomizing surface 115 of the ultrasonic nozzle 105. The spray 120 expelled from the atomizing surface 115 of the nozzle 105 can be controlled and shaped precisely by entraining the low-velocity spray 120 in an ancillary air stream, such as provided by air jet 130 for example. The shape of the spray 120 can be controlled not only by the shape of the ultrasonic nozzle 105 used, but also by adjusting the position and angle of the one or more air jets 130 relative to the atomizing surface 115 of the ultrasonic nozzle 105, which results in a generally uniform distribution of spray droplets. In one embodiment, the shape of the spray 120 can have a width in the range of about 0.015 in and about 3 in.

It should be appreciated that although the system 10 is shown as a continuous line in FIGS. 1 and 2, in other embodiments, one or more of these components of the comestible manufacturing system 10 may be located in different parts of a manufacturing plant or even in a different manufacturing plant. For example, in one embodiment, the comestible mixing system 20 is located in one plant, and the comestible forming system 55 and other subsequent components, such as the scoring and dividing rollers and packaging components, are located in a different plant, wherein the mixed comestible mass 15 transferred from one plant to the other for subsequent processes.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of manufacturing a comestible, the method comprising:
   providing at least one manufacturing instrument configured to contact the comestible;
   atomizing a releasing agent and expelling said releasing agent from an expelling device, wherein application of pressure to said releasing agent is unnecessary to achieve said atomizing;
   applying said spray of said releasing agent to either a surface of said at least one manufacturing instrument configured to contact the comestible, or to a surface of the comestible; and
   controlling a shape of said spray of releasing agent applied to said surface of said at least one manufacturing instrument configured to contact the comestible or to said surface of the comestible by adjusting at least one of a position and angle of an air jet relative to an atomizing surface of said expelling device.

2. The method according to claim 1, further including applying vibrations to said releasing agent via said expelling device to achieve said atomizing.

3. The method according to claim 2, where said vibrations are ultrasonic vibrations.

4. The method according to claim 1, wherein said expelling device is configured to expel said atomized spray of the releasing agent at a velocity less than 35 ft/s.

5. The method according to claim 1, wherein said expelling device includes an adjacent air jet configured to supply an air stream such that said releasing agent from said expelling device becomes entrained in said air stream.

6. The method according to claim 5, wherein said air jet is configured to control a shape of said atomized releasing agent expelled from said expelling device.

7. The method according to claim 1, wherein said at least one manufacturing instrument is at least one roller configured to size a comestible.

8. The method according to claim 1, wherein said at least one manufacturing instrument is a pair of rollers configured to size a comestible.

9. The method according to claim 1, wherein said at least one manufacturing instrument is selected from one of a forming roller, a pair of forming rollers, a scoring roller, a cutting roller, a roller in a rope sizing system, a roller in a cutting and scoring line, and a guillotine style blade of cut and wrap system.

10. The method according to claim 1, wherein said releasing agent includes a flavor configured to be transferred to the comestible.

11. The method according to claim 1, wherein the comestible is a chewing gum.

12. The method according to claim 1, wherein said expelling device is configured to uniformly distribute said releasing agent over said surface of the at least one manufacturing instrument configured to contact the comestible, or said surface of the comestible.

13. The method according to claim 12, wherein said velocity of the releasing agent expelled is between about 0.7 ft/s and about 1.2 ft/s.

14. The method according to claim 12, wherein said expelling device includes an ultrasonic nozzle.

15. The method according to claim 12, wherein said releasing agent is expelled from said expelling device as an atomizing spray including a plurality of droplets.

16. The method according to claim 15, where a substantial entirety of said plurality of droplets of atomizing spray settle and remain on said surface of either said at least one manufacturing instrument configured to contact the comestible or the comestible.

17. The method according to claim 15, wherein said expelling device is configured to uniformly distribute said plurality of droplets of releasing agent.

18. The method according to claim 12, wherein said expelling device is positioned generally vertically above a horizontal mid-point manufacturing instrument.

19. The method according to claim 12, wherein said at least one manufacturing instrument is at least one roller configured to size the comestible.

20. The method according to claim 12, wherein said at least one manufacturing instrument is a pair of rollers configured to size the comestible.

21. The method according to claim 12, wherein said at least one manufacturing instrument is selected from one of a forming roller, a pair of forming rollers, a scoring roller, a cutting roller, a roller in a rope sizing system, a roller in a cutting and scoring line, and a guillotine style blade of cut and wrap system.

22. The method according to claim 12, wherein the comestible is a chewing gum.

23. A method of manufacturing a comestible which requires application of a releasing agent, the method comprising:
   providing at least one manufacturing instrument configured to contact the comestible;
   providing an expelling device configured to expel a spray of said releasing agent at a velocity less than 35 ft/s;
   applying said spray of said releasing agent to a surface of either the at least one manufacturing instrument configured to contact the comestible, or to a surface of the comestible, wherein said expelling device is offset from said surface of said at least one manufacturing instrument configured to contact the comestible or from said surface of the comestible; and
   controlling a shape of said spray of said releasing agent applied to said surface of said at least one manufacturing instrument configured to contact the comestible or to said surface of the comestible by adjusting at least one of a position and angle of an air jet relative to an atomizing surface of said expelling device.

24. A method of manufacturing a comestible which requires application of a releasing agent, the method comprising:
   providing at least one manufacturing instrument configured to contact a comestible;
   providing at least one expelling device configured to expel a spray of said releasing agent, said spray of releasing agent including a plurality of uniformly distributed droplets,
   applying the releasing agent to a surface of either the at least one manufacturing instrument configured to contact the comestible, or to a surface of the comestible, wherein said at least one expelling device is offset from said surface of said at least one manufacturing instrument configured to contact the comestible or from said surface of the comestible; and controlling a shape of said spray of releasing agent output from the at least one expelling device by adjusting at least one of a position and angle of an air jet relative to an atomizing surface of the expelling device.

25. The method according to claim 24, where a substantial entirety of said plurality of droplets settle and remain on said surface of either said at least one manufacturing instrument configured to contact the comestible or the comestible.

26. The method according to claim 24, wherein said at least one expelling device includes an ultrasonic nozzle.

27. The method according to claim 24, wherein said releasing agent is expelled from said expelling device as an atomizing spray including the plurality of uniformly distributed droplets.

28. The method according to claim 24, wherein said spray from the ultrasonic nozzle becomes entrained in an air stream of said air jet.

29. The method according to claim 24, wherein said at least one manufacturing instrument is at least one roller configured to size a comestible.

30. The method according to claim 24, wherein said at least one manufacturing instrument is a pair of rollers configured to size a comestible.

31. The method according to claim 24, wherein said at least one manufacturing instrument is selected from one of a forming roller, a pair of forming rollers, a scoring roller, a cutting roller, a roller in a rope sizing system, a roller in a cutting and scoring line, and a guillotine style blade of cut and wrap system.

32. The method according to claim 24, wherein the comestible is a chewing gum.

33. The method according to claim 24, wherein said plurality of uniformly distributed droplets form a continuous coating over said surface of said at least one manufacturing instrument configured to contact the comestible, or said surface of the comestible.

34. The method according to claim 24, wherein said plurality of uniformly distributed droplets form a dis-continuous coating over said surface of said at least one manufacturing instrument configured to contact the comestible, or said surface of the comestible.

* * * * *